(12) United States Patent
Fereydoon et al.

(10) Patent No.: US 12,486,345 B2
(45) Date of Patent: Dec. 2, 2025

(54) ETHYLENE COPOLYMER FOR BIAXIAL ORIENTATION

(71) Applicant: NOVA Chemicals (International) S.A., Fribourg (CH)

(72) Inventors: Maryam Fereydoon, Houston, TX (US); Shivendra Goyal, Calgary (CA); Stephen Brown, Calgary (CA); Owen Lightbody, Calgary (CA); Norman Aubee, Calgary (CA); Bronwyn Gillon, Calgary (CA); Thomas Green, Petrolia (CA); Lison Mark, Bright's Grove (CA); Christian Carello, Calgary (CA)

(73) Assignee: NOVA Chemicals (International) S.A., Fribourg (CH)

(*) Notice: Subject to any disclaimer, the term of this patent is extended or adjusted under 35 U.S.C. 154(b) by 565 days.

(21) Appl. No.: 18/002,911

(22) PCT Filed: Jun. 23, 2021

(86) PCT No.: PCT/IB2021/055555
§ 371 (c)(1),
(2) Date: Dec. 22, 2022

(87) PCT Pub. No.: WO2022/003499
PCT Pub. Date: Jan. 6, 2022

(65) Prior Publication Data
US 2023/0235106 A1      Jul. 27, 2023

Related U.S. Application Data

(60) Provisional application No. 63/045,383, filed on Jun. 29, 2020.

(30) Foreign Application Priority Data

Dec. 14, 2020   (CA) .................................. 3102574

(51) Int. Cl.
    $C08F\ 210/16$       (2006.01)
    $C08F\ 2/01$         (2006.01)
    (Continued)

(52) U.S. Cl.
    CPC .............. $C08F\ 210/16$ (2013.01); $C08F\ 2/01$ (2013.01); $C08F\ 4/685$ (2013.01); $C08F\ 2/001$ (2013.01);
    (Continued)

(58) Field of Classification Search
    CPC ............... C08F 210/16; C08F 2500/07; C08F 2500/04; C08F 2500/12; C08F 2/001; C08F 2/01; C08F 2/04; C08F 4/06
    See application file for complete search history.

(56) References Cited

U.S. PATENT DOCUMENTS 2,862,917 A    12/1958   Pont
3,380,978 A    4/1968    Pont
(Continued)

FOREIGN PATENT DOCUMENTS

CA     703704 A    2/1965
CA     849081 A    8/1970
(Continued)

OTHER PUBLICATIONS

ASTM D1238-04 Standard Test Method for Melt Flow Rates of Thermoplastics by Extrusion Plastometer—Copyright ASTM International—Current edition approved Mar. 1, 2004. Published Apr. 2004. Originally approved in 1965. Last previous edition approved in 2001 as D1238-01 (pp. 1-13).
(Continued)

Primary Examiner — Rip A Lee
(74) Attorney, Agent, or Firm — Thomas J. Stylinger

(57) ABSTRACT

An ethylene copolymer comprising ethylene and at least one alpha olefin having from 4 to 8 carbon atoms has a density
(Continued)

f from 0.940 to 0.960 g/cm³, a molecular weight distribution, Mw/Mn of from 9 to 12, and a Z-average molecular weight, Mz of greater than 500,000. The ethylene copolymer is made in a multi-zone reactor system under solution phase polymerization conditions and is useful in the preparation of biaxially oriented polyethylene (BOPE) films.

23 Claims, 7 Drawing Sheets

(51) Int. Cl.
  *C08F 4/685*  (2006.01)
  *C08F 2/00*  (2006.01)
(52) U.S. Cl.
  CPC ...... *C08F 2500/04* (2013.01); *C08F 2500/07* (2013.01)

(56) References Cited

U.S. PATENT DOCUMENTS

| | | | |
|---|---|---|---|
| 3,663,662 A | 5/1972 | Golike et al. | |
| 4,383,093 A | 5/1983 | Shiraki et al. | |
| 4,472,330 A | 9/1984 | Ashcraft | |
| 4,590,020 A | 5/1986 | Itaba et al. | |
| 4,870,122 A | 9/1989 | Lu | |
| 4,916,025 A | 4/1990 | Lu | |
| 5,043,204 A | 8/1991 | Itaba et al. | |
| 5,241,030 A | 8/1993 | Barry et al. | |
| 5,519,098 A | 5/1996 | Brown et al. | |
| 5,589,555 A * | 12/1996 | Zboril | C08F 10/02 502/115 |
| 5,589,561 A | 12/1996 | Barry et al. | |
| 5,725,962 A | 3/1998 | Bader et al. | |
| 5,885,721 A | 3/1999 | Su et al. | |
| 5,891,555 A | 4/1999 | O'Brien | |
| 6,084,042 A | 7/2000 | Jaber et al. | |
| 6,168,826 B1 | 1/2001 | Su et al. | |
| 6,303,233 B1 | 10/2001 | Amon et al. | |
| 6,387,529 B1 | 5/2002 | Peet | |
| 6,479,137 B1 | 11/2002 | Joyner et al. | |
| 6,518,372 B1 | 2/2003 | Weickert | |
| 6,689,857 B1 | 2/2004 | Larter et al. | |
| 6,764,751 B2 | 7/2004 | Poirier | |
| 6,946,203 B1 | 9/2005 | Lockhart et al. | |
| 8,080,294 B2 | 12/2011 | Lu | |
| 8,962,755 B2 * | 2/2015 | Wang | C08L 23/08 526/348 |
| 9,062,138 B2 * | 6/2015 | Ker | C08F 210/16 |
| 9,074,082 B2 * | 7/2015 | Wang | C08L 23/0815 |
| 9,221,966 B2 * | 12/2015 | Wang | C08F 210/16 |
| 9,371,442 B2 * | 6/2016 | Wang | C08F 210/16 |
| 9,475,927 B2 * | 10/2016 | Wang | B29C 45/0001 |
| 9,676,169 B2 | 6/2017 | Paulino | |
| 9,724,901 B2 | 8/2017 | Lu | |
| 9,758,653 B2 * | 9/2017 | Wang | C08L 23/0815 |
| 9,783,663 B2 * | 10/2017 | Wang | B65D 47/0804 |
| 9,783,664 B1 * | 10/2017 | Wang | B29C 43/021 |
| 9,963,529 B1 * | 5/2018 | Kazemi | B01J 4/02 |
| 10,040,261 B2 | 8/2018 | Mcleod et al. | |
| 10,071,826 B2 * | 9/2018 | Wang | B67C 7/00 |
| 10,071,895 B2 * | 9/2018 | Wang | B67C 3/22 |
| 10,093,780 B2 * | 10/2018 | Wang | B32B 27/08 |
| 10,189,922 B2 * | 1/2019 | Goyal | B32B 27/327 |
| 10,239,976 B2 * | 3/2019 | Goyal | C08F 210/16 |
| 10,329,412 B2 | 6/2019 | Wang et al. | |
| 10,363,700 B2 | 7/2019 | Yun et al. | |
| 10,584,523 B2 * | 3/2020 | Wang | C08F 10/02 |
| 10,625,914 B2 * | 4/2020 | Wang | B65D 55/16 |
| 10,792,899 B2 | 10/2020 | Pan et al. | |
| 11,046,491 B2 * | 6/2021 | Wang | B65D 41/34 |
| 11,046,843 B2 * | 6/2021 | Konaganti | B32B 27/08 |
| 11,149,137 B2 * | 10/2021 | Wang | C08L 23/0815 |
| 11,279,819 B2 * | 3/2022 | Wang | C08L 23/0815 |
| 11,306,196 B2 * | 4/2022 | Wang | C08L 23/08 |
| 11,312,845 B2 * | 4/2022 | Sadeghi | C08J 5/18 |
| 11,339,278 B2 * | 5/2022 | Wang | C08F 210/16 |
| 11,352,485 B2 * | 6/2022 | Wang | C08L 23/0815 |
| 11,359,081 B2 * | 6/2022 | Wang | C08L 23/0815 |
| 11,560,468 B2 * | 1/2023 | Wang | C08L 23/0815 |
| 11,643,531 B2 * | 5/2023 | Wang | C08L 23/0815 428/516 |
| 11,958,961 B2 * | 4/2024 | Wang | C08L 23/0815 |
| 2001/0021754 A1 * | 9/2001 | Weber | C08F 210/16 526/90 |
| 2004/0105944 A1 * | 6/2004 | Weber | B65D 1/26 428/35.7 |
| 2006/0177641 A1 | 8/2006 | Breese et al. | |
| 2010/0129652 A1 | 5/2010 | Mcleod | |
| 2013/0209756 A1 | 8/2013 | Squier et al. | |
| 2015/0094418 A1 * | 4/2015 | Wang | C08F 10/02 525/240 |
| 2016/0031191 A1 | 2/2016 | Paulino | |
| 2019/0299578 A1 | 10/2019 | Dou et al. | |
| 2020/0061982 A1 | 2/2020 | Ambroise | |
| 2020/0270395 A1 | 8/2020 | Peer et al. | |
| 2020/0369014 A1 | 11/2020 | Ambroise | |
| 2021/0115206 A1 | 4/2021 | Toyota et al. | |
| 2022/0402192 A1 * | 12/2022 | Aubee | B29C 55/143 |

FOREIGN PATENT DOCUMENTS

| | | |
|---|---|---|
| EP | 0 929 583 A1 | 4/1998 |
| EP | 1 037 742 A1 | 9/2000 |
| EP | 1 819 510 B1 | 8/2007 |
| EP | 3 335 874 A1 | 6/2018 |
| JP | 2010-535273 A | 11/2010 |
| JP | 2019-143142 A | 8/2019 |
| KR | 101085329 B1 | 11/2011 |
| WO | WO-97/22470 A1 | 6/1997 |
| WO | WO-98/14491 A1 | 4/1998 |
| WO | WO-2008/136849 A1 | 11/2008 |
| WO | WO-2011/069240 A1 | 6/2011 |
| WO | WO-2014/106052 A1 | 7/2014 |
| WO | WO-2018/005577 A1 | 1/2018 |
| WO | WO-2018/109112 A1 | 6/2018 |
| WO | WO-2021/079255 A1 | 4/2021 |

OTHER PUBLICATIONS

Datasheet of Affinity EG 8100G Polyolefin Plastomer, The Dow Chemical Company, Jan. 12, 2016 (2 pages).
ASTM D1003-11—Standard Test Method for Haze and Luminous Transmittance of Transparent Plastics—Copyright ASTM International—Current edition approved Apr. 15, 2011. Published Apr. 2011. Originally approved in 1949. Last previous edition approved in 2007 as D1003-07 (pp. 1-7).
ASTM D1238-13—Standard Test Method for Melt Flow Rates of Thermoplastics by Extrusion Plastometer—Copyright ASTM International—Current edition approved Aug. 1, 2013. Published Aug. 2013. Originally approved in 1965. Last previous edition approved in 2010 as D1238-10 (pp. 1-16).
ASTM D1525-07—Standard Test Method for Vicat Softening Temperature of Plastics—Copyright ASTM International—Current edition approved Mar. 1, 2007. Published Mar. 2007. Originally approved in 1958. Last previous edition approved in 2006 as D1525-06 (pp. 1-9).
ASTM D1922-09—Standard Test Method for Propagation Tear Resistance of Plastic Film and Thin Sheeting by Pendulum Method—Copyright ASTM International—Current edition approved May 1, 2009. Published Jun. 2009. Originally approved in 1961. Last previous edition approved in 2008 as D1922- 08 (pp. 1-7).
ASTM D2457-13—Standard Test Method for Specular Gloss of Plastic Films and Solid Plastics—Copyright ASTM International—Current edition approved Apr. 1, 2013. Published Apr. 2013. Originally approved in 1965. Last previous edition approved in 2008 as D2457-08 (pp. 1-6).
ASTM D3985-17—Standard Test Method for Oxygen Gas Transmission Rate Through Plastic Film and Sheeting Using a Coulometric

(56) References Cited

OTHER PUBLICATIONS

Sensor—Copyright ASTM International—Current edition approved Nov. 15, 2017. Published Dec. 2017. Originally approved in 1981. Last previous edition approved in 2010 as D3985-05 (pp. 1-7).
ASTM D5748-95—Standard Test Method for Protrusion Puncture Resistance of Stretch Wrap Film—Copyright ASTM International—Current edition approved Apr. 1, 2012. Published May 2012. Originally approved in 1995. Last previous edition approved in 2007 as D5748-95 (pp. 1-4).
ASTM D6474-12—Standard Test Method for Determining Molecular Weight Distribution and Molecular Weight Averages of Polyolefins by High Temperature Gel Permeation Chromatography—Copyright ASTM International—Current edition approved Dec. 15, 2012. Published Dec. 2012. Originally approved in 1999. Last previous edition approved in 2006 as D6474-99. (pp. 1-6).
ASTM D6474-99 (Reapproved 2006)—Standard Test Method for Determining Molecular Weight Distribution and Molecular Weight Averages of Polyolefins by High Temperature Gel Permeation Chromatography. Copyright ASTM International. Current edition approved Mar. 15, 2006. Published Apr. 2006. Originally approved in 1999. Last previous edition approved in 1999 as D6474-99 (pp. 1-6).
ASTM D6988-13—Standard Test Method for Determination of Thickness of Plastic Film Test Specimens—Copyright ASTM International—Current edition approved Apr. 1, 2013. Published Apr. 2013. Originally approved in 2003. Last previous edition approved in 2008 as D6988-08 (pp. 1-7).
ASTM D792-13—Standard Test Methods for Density and Specific Gravity (Relative Density) of Plastics by Displacement—Copyright ASTM International—Current edition approved Nov. 1, 2013. Published Nov. 2013. Originally approved in 1944. Last previous edition approved in 2008 as D792-08 (pp. 1-6).
ASTM D882-12—Standard Test Method for Tensile Properties of Thin Plastic Sheeting—Copyright ASTM International—Current edition approved Aug. 1, 2012. Published Sep. 2012. Originally approved in 1946. Last previous edition approved in 2010 as D882-10. (pp. 1-11).
ASTM D972-16—Standard Test Method for Evaporation Loss of Lubricating Greases and Oils—Copyright ASTM International—Current edition approved Apr. 1, 2016. Published May 2016. Originally approved in 1948. Last previous edition approved in 2008 as D972-02 (pp. 1-5).
ASTM F1249-20—Standard Test Method for Water Vapor Transmission Rate Through Plastic Film and Sheeting Using a Modulated Infrared Sensor—Copyright ASTM International—Current edition approved Jun. 1, 2020. Published Jul. 2020. Originally approved in 1989. Last previous edition approved in 2013 as F1249-13. (pp. 1-6).
Bird et al., "Dynamics of Polymer Liquids. Volume 1: Fluid Mechanics", John Wiley & Sons, 1987, pp. 169-175.
Carreau-Yasuda model, K. Yasuda PHD Thesis, IT Cambridge (1979).
Deslauriers et al., Quantifying short chain branching microstructures in ethylene 1-olefin copolymers using size exclusion chromatography and Fourier transform infrared spectroscopy (SEC-FTIR), Polymer 43, 2002, pp. 159-170.
Graessley et al., "Effect of Long Branches on the Flow Properties of Polymers", Acc. Chem. Res., vol. 10, 1977, pp. 332-339.
International Search Report & Written Opinion of the International Searching Authority issued in PCT Application No. PCT/IB2020/059816, mailed Jan. 20, 2021.
Kanai et al. in the textbook "Film Processing Advances", Hanser Publishers, 2014, Chapter 7.
Kanai et al. in the textbook "Film Processing Advances", Hanser Publishers, 2014, Chapter 8.
Randall et al., "A Review of High Resolution Liquid 13Carbon Nuclear Magnetic Resonance Characterizations of Ethylene-Based Polymers", JMS—Rev. Macromol. Chem. Phys., 1989, pp. 201-317.
Wild et al., "Determination of Branching Distributions in Polyethylene and Ethylene Copolymers", J. Polym. Sci., Part B, Polym. Phys., vol. 20 (3), pp. 441-455.
Yau et al., "Application of Triple-Detector Size Exclusion Chromatography (On-Line Differential Refractometer, Viscometer and Light Scattering Detectors) for the Characterization of Brominated Polystyrene", Int. J. Polym. Anal. Charact., 1996, pp. 151-171.
International Search Report & Written Opinion of the International Searching Authority issued in PCT Application No. PCT/IB2021/055555, mailed Feb. 24, 2022.

\* cited by examiner

ETHYLENE COPOLYMER FOR BIAXIAL ORIENTATION

CROSS-REFERENCE TO RELATED APPLICATIONS

This application is a U.S. National Phase Application under 35 U.S.C. § 371 of International Application No. PCT/IB2021/055555, filed Jun. 23, 2021, which claims priority to and the benefit of Canadian Patent Application No. 3,102,574, filed on Dec. 14, 2020, and to U.S. Provisional Application No. 63/045,383, filed Jun. 29, 2020, all of which are hereby incorporated by reference in their entireties.

TECHNICAL FIELD

Ethylene copolymers comprising ethylene and at least one alpha olefin having from 4 to 8 carbon atoms and having a density of from 0.940 to 0.960 g/cm³ are made in a multi-zone reactor system under solution phase polymerization conditions and are useful in the formation of biaxially oriented films.

BACKGROUND ART

Biaxially oriented polyethylene (BOPE) films are prepared by stretching a thick precursor (or base) film, typically known as a cast sheet, in two directions: the machine direction (MD) and the transverse direction (TD). The stretching may be conducted in a single procedure (simultaneous biaxial stretching) or in two sequential procedures (sequential biaxial stretching). The equipment used in the stretching process is commonly referred to as a "tenter frame" line.

In comparison to traditional blown film, BOPE film can achieve up to twice the stiffness (tensile modulus), improved tensile strength, impact strength, puncture resistance, flex cracking resistance and improved (i.e. lower) optical haze.

BOPE films are suitable for a wide variety of packaging applications. The outstanding properties of the film allow the design of "all polyethylene packages" (as opposed to packages made with different types of polymers) and this facilitates recycling.

The tenter frame process is in wide use for the preparation of biaxially oriented polypropylene (BOPP) and biaxially oriented polyethylene terephthalate (BOPET) films. However, polyethylene is comparatively difficult to stretch/biaxially orient and this has limited the commercial use of BOPE. Hence, a need exists for a polyethylene that provides better "stretchability" in a tenter frame, BOPE process.

SUMMARY OF INVENTION

An embodiment of the disclosure is an ethylene copolymer comprising ethylene and at least one alpha olefin having from 4 to 8 carbon atoms; the ethylene copolymer having a density of 0.940 to 0.960 grams per cubic centimeter (g/cm³); a melt index, $I_2$ as measured by ASTM D1238 at 190° C. using a 2.16 kilogram load, of from 0.5 to 2.5 grams per 10 minutes (g/10 min); a stress exponent of from 1.75 to 1.95; a number average molecular weight, Mn, of from 11,000 to 15,000; a polydispersity index, (Mw/Mn), of from 9 to 12; and a Z-average molecular weight, Mz, of from 500,000 to 800,000.

An embodiment of the disclosure is a solution phase polymerization process to make an ethylene copolymer in a multi-zone reactor system, the multi-zone-reactor system comprising a first, second and third polymerization zone, wherein the first polymerization zone is defined by a first tubular reactor having an inlet and an outlet, the polymerization process comprising: feeding solvent, hydrogen, a Ziegler-Natta polymerization catalyst, ethylene, and at least one alpha olefin having 4 to 8 carbon atoms, to the inlet of the first tubular reactor to initiate a polymerization reaction; feeding hydrogen to at least one location in the first tubular reactor which is downstream from the inlet of the first tubular reactor; wherein at least 80 weight percent of the total amount of hydrogen added to the multi-zone reactor system, is added to the at least one location in the first tubular reactor which is downstream from the inlet of the first tubular reactor; and wherein from 20 to 50 weight percent of the total amount of ethylene copolymer made in the multi-zone reactor system is made in the first tubular reactor.

An embodiment of the disclosure is a solution phase polymerization process to make an ethylene copolymer in a multi-zone reactor system, the multi-zone reactor system comprising a first, second and third polymerization zone, wherein the first polymerization zone is defined by a first tubular reactor having an inlet and an outlet, the polymerization process comprising: feeding solvent, hydrogen, a Ziegler-Natta polymerization catalyst, ethylene, and at least one alpha olefin having 4 to 8 carbon atoms, to an inlet of the first tubular reactor to initiate a polymerization reaction; feeding hydrogen to at least one location in the first tubular reactor which is downstream from the inlet of the first tubular reactor; wherein at least 80 weight percent of the total amount of hydrogen added to the multi-zone reactor system, is added to the at least one location in the first tubular reactor which is downstream from the inlet of the first tubular reactor; the ethylene copolymer having a density of 0.940 to 0.960 grams per cubic centimeter (g/cm³); a melt index, $I_2$ as measured by ASTM D1238 at 190° C. using a 2.16 kilogram load, of from 0.5 to 2.5 grams per 10 minutes (g/10 min); a stress exponent of from 1.75 to 1.95; a number average molecular weight, Mn, of from 11,000 to 15,000; a polydispersity index, (Mw/Mn), of from 9 to 12; and a Z-average molecular weight, Mz, of from 500,000 to 800,000.

An embodiment of the disclosure is a biaxially oriented polyethylene film comprising an ethylene copolymer, the ethylene copolymer comprising ethylene and at least one alpha olefin having from 4 to 8 carbon atoms; the ethylene copolymer having a density of 0.940 to 0.960 grams per cubic centimeter (g/cm³); a melt index, $I_2$ as measured by ASTM D1238 at 190° C. using a 2.16 kilogram load, of from 0.5 to 2.5 grams per 10 minutes (g/10 min); a stress exponent of from 1.75 to 1.95; a number average molecular weight, Mn, of from 11,000 to 15,000; a polydispersity index, (Mw/Mn), of from 9 to 12; and a Z-average molecular weight, Mz, of from 500,000 to 800,000.

DESCRIPTION OF EMBODIMENTS

Figure 1:
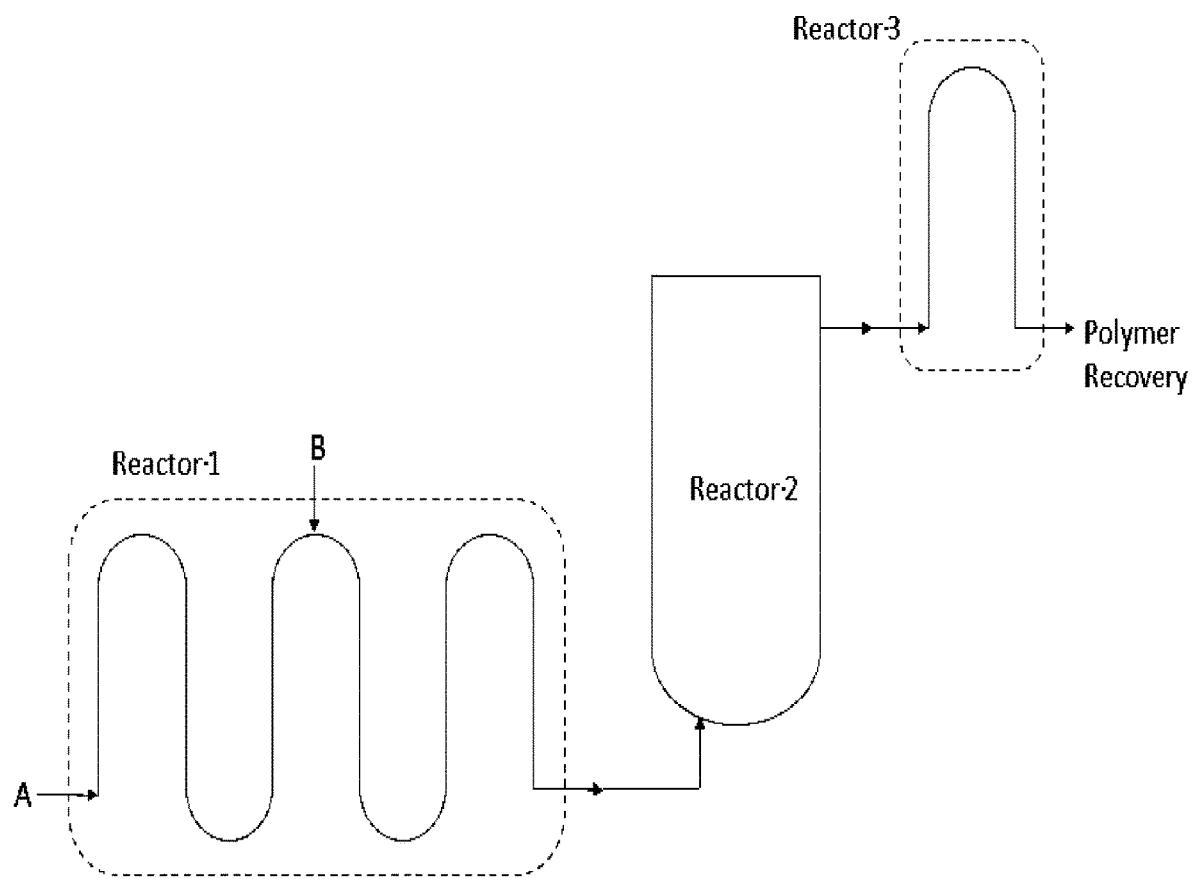
FIG. 1 shows a schematic drawing of an embodiment of the disclosure in which a multi-zone reactor system includes a first polymerization zone defined by a first tubular reactor, a second polymerization zone defined by a tank reactor, and a third polymerization zone defined by a second tubular reactor. The schematic is only representative of the multi-zone reactor system and is not drawn to scale. The approximate locations of hydrogen addition to the multi-zone reactor system are also shown (locations A and B).

As used herein, the term "monomer" refers to a small molecule that may chemically react and become chemically bonded with itself or other monomers to form a polymer.

As used herein, the term "α-olefin" or "alpha-olefin" is used to describe a monomer having a linear hydrocarbon chain containing from 3 to 20 carbon atoms and having a double bond at one end of the chain; an equivalent term is "linear α-olefin". An alpha olefin may also be referred to as a "comonomer".

As used herein, the term "polyethylene" or "ethylene polymer", refers to macromolecules produced from ethylene monomers and optionally one or more additional monomers; regardless of the specific catalyst or specific process used to make the ethylene polymer. In the polyethylene art, the one or more additional monomers are often called "comonomer(s)" and often include α-olefins. The term "homopolymer" refers to a polymer that contains only one type of monomer. An "ethylene homopolymer" for example, is made using only ethylene as a polymerizable monomer. The term "copolymer" refers to a polymer that contains two or more types of monomer. An "ethylene copolymer" is made using ethylene and one or more other types of polymerizable monomer (e.g. an alpha-olefin). Common polyethylenes include high density polyethylene (HDPE); medium density polyethylene (MDPE); linear low density polyethylene (LLDPE); and very low density polyethylene (VLDPE) or ultralow density polyethylene (ULDPE) which are also known as plastomers and elastomers. The term polyethylene also includes polyethylene terpolymers which may include two or more comonomers in addition to ethylene. The term polyethylene also includes combinations of, or blends of, the polyethylenes described above.

In the present disclosure a solution phase polymerization process is carried out in a multi-zone reactor system to prepare an ethylene copolymer comprising ethylene and at least one alpha olefin having from 4 to 8 carbon atoms.

In the present disclosure, a solvent, polymerizable monomers (e.g. ethylene and at least one alpha olefin), polymerization catalyst components, and hydrogen are fed to a multi-zone reactor system.

In an embodiment of the disclosure, the multi-zone reactor system is further defined by a first, second and third polymerization zone.

In an embodiment of the disclosure, the first polymerization zone is defined by a first tubular reactor. In an embodiment of the disclosure, the first polymerization zone is defined by a first tubular reactor having an upstream inlet located at the upstream end of the first tubular reactor and a downstream outlet located at the downstream end of the first tubular reactor. In an embodiment of the disclosure, the first polymerization zone is defined by a first tubular reactor having an upstream inlet located at the upstream end of the first tubular reactor and a downstream outlet located at the downstream end of the first tubular reactor and one or more additional process flow entry points located along the length of the first tubular reactor at one or more locations between the upstream inlet and the downstream outlet.

In an embodiment of the disclosure, the second polymerization zone is defined by a tank (or autoclave) reactor. In an embodiment of the disclosure, the second polymerization zone is defined by a tank (or autoclave) reactor having an inlet and an outlet. In an embodiment of the disclosure, the second polymerization zone is defined by a tank (or autoclave) reactor having an inlet and an outlet and one or more additional process flow entry points located between the inlet and the outlet.

In embodiments of the disclosure the tank reactor is an optionally stirred tank reactor comprising an agitator.

In an embodiment of the disclosure, the third polymerization zone is defined by a second tubular reactor. In an embodiment of the disclosure, the third polymerization zone is defined by a second tubular reactor having an upstream inlet located at the upstream end of the second tubular reactor and a downstream outlet located at the downstream end of the second tubular reactor. In an embodiment of the disclosure, the third polymerization zone is defined by a second tubular reactor having an upstream inlet located at the upstream end of the second tubular reactor and a downstream outlet located at the downstream end of the second tubular reactor and one or more additional process flow entry points located along the length of the second tubular reactor at one or more locations between the upstream inlet and the downstream outlet.

With reference to FIG. 1, in an embodiment of the disclosure, an ethylene copolymer was prepared in a multi-zone solution polymerization process in which three polymerization zones, each defined by a different polymerization reactor, were configured in series with one another. The first polymerization zone was defined by a first tubular reactor (reactor 1); the second polymerization zone was defined by an optionally stirred tank reactor (reactor 2); and a third polymerization zone was defined by a second tubular reactor (reactor 3). Each of the reactors has an inlet, where process flows enter the reactor, and an outlet, where process flows exit the reactor. For a tubular reactor (reactor 1 or reactor 3), the inlet is located at the upstream end of the tubular reactor, and the outlet is located at downstream end of the tubular reactor. The inlet of the first tubular reactor receives polymerization process feeds (which are pumped to an upstream inlet of the first tubular reactor) such as: polymerization process solvent, polymerization catalyst components, cocatalysts, polymerizable monomers (e.g. ethylene and alpha olefin), and hydrogen. The polymerization reaction is initiated at the upstream inlet of the first tubular reactor and proceeds throughout the length of the first tubular reactor as process flows are pumped downstream toward the outlet of the first tubular reactor. The optionally stirred, tank reactor (reactor 2), receives process flows from the first tubular reactor, and the polymerization reaction continues in the tank reactor. The second tubular reactor (reactor 3) receives process flows from the tank reactor, and the polymerization reaction continues throughout the length of the second tubular reactor. At the outlet of the second tubular reactor, the polymerization reaction is terminated by adding a catalyst deactivator. A variety of deactivators are known, and non-limiting examples include fatty acids, alkaline earth metal salts of aliphatic carboxylic acids and alcohols. The polymer may then be recovered in the traditional manner by process solvent devolatilization (not shown in FIG. 1). Conventional distillation facilities may be employed to recover solvent and unreacted comonomer (not shown in FIG. 1).

In an embodiment of the disclosure, the ethylene copolymer is recovered from the solution using known unit operations including heaters, an optional absorber to remove the catalyst residues, an intermediate pressure separator (IPS) and a pair of two-stage steam-fed low-pressure separators (LPS). The recovered ethylene copolymer is then pelletized in an extruder and devolatilized in a stripper to remove residual solvent and comonomer.

In an embodiment of the disclosure, the first tubular reactor (reactor 1) is operated adiabatically.

In an embodiment of the disclosure, the tank reactor (reactor 2) is operated adiabatically.

In an embodiment of the disclosure, the second tubular reactor (reactor 3) is operated adiabatically.

In an embodiment of the disclosure, the multi-zone reactor system is operated adiabatically.

In the present disclosure the phrase "operated adiabatically", refers to a reactor or a multi-zone reactor system which has no active heat removal mechanism and no active heat addition mechanism.

In an embodiment of the disclosure, although the tank reactor (reactor 2) is an optionally stirred, tank reactor in which an agitator is present, the tank reactor is operated without agitation, and hence functions not as a continuously stirred tank reactor, but instead as a sort of plug flow reactor. In the present disclosure, a tank (or autoclave) reactor which is equipped with an agitator is referred to as operating in "plug flow mode" when the agitator is shut off. Without wishing to be bound by theory, when the tank reactor (reactor 2) is used without agitation, the multi-zone reactor system can be described as a long tubular reactor system comprising three polymerization reaction zones, with each polymerization reaction zone being defined by a tubular reactor having a different diameter (and optionally operating adiabatically).

In an embodiment of the disclosure, the monomers polymerized in the solution phase polymerization process are ethylene and 1-butene.

A wide variety of solvents can be used for the solution phase polymerization process, but in an embodiment of the disclosure, the solvent is a hydrocarbon solvent.

In embodiments of the disclosure, the solvent used for the solution phase polymerization process is cyclohexane, or methylcyclohexane.

In an embodiment of the disclosure, all the monomer (e.g. ethylene and one or more alpha olefin) which is used in the solution phase polymerization is fed to the inlet of the first tubular reactor (reactor 1). In an embodiment of the disclosure, all the monomer (e.g. ethylene and one or more alpha olefin) and catalyst components (e.g. Ziegler-Natta precatalytic components and cocatalyst) which are used in the solution phase polymerization are fed to the inlet of the first tubular reactor (reactor 1). In these embodiments, and without wishing to be bound by theory, as the polymer solution flows through the multi-zone reactor system, additional polymer is formed under conditions of decreasing ethylene (and alpha olefin comonomer) concentration and increasing temperature, and monomer conversion continues within the tank reactor (reactor 2), and the second tubular reactor (reactor 3), optionally without further catalyst addition to these reactors. A person skilled in the art will know that if the individual reactors are equipped with instruments to measure temperature, then the ethylene conversion can be estimated/determined within each reactor with a heat and mass balance using well known techniques.

In embodiments of the disclosure, the amount of ethylene copolymer formed in each reactor will be a function of several variables such as for example the active polymerization catalyst concentration (which may in turn depend of the molar ratio of cocatalyst compounds to precatalystic compounds), the monomer (e.g. ethylene and alpha olefin) concentration, reactor temperature, and the polymerization hold up time.

In embodiments of the disclosure, the polymerization hold-up time in each of the first tubular reactor (reactor 1), the tank reactor (reactor 2) and the second tubular reactor (reactor 3) is adjusted to control the amount of ethylene copolymer made in each reactor.

The polymerization hold-up time is the amount of time during which polymerizable monomers are being polymerized in the presence of an active polymerization catalyst to produce an ethylene copolymer. The polymerization hold-up time may be adjusted by changing variables such as process flows or throughput rates, the volume of the reactors, and polymerization catalyst component feed locations to the reactors.

In embodiments of the disclosure, the polymerization hold-up time in the first tubular reactor (reactor 1) is from 0.5 to 100 seconds, or from 1 to 15 seconds.

In embodiments of the disclosure, the polymerization hold-up time in the tank reactor (reactor 2) is at least 0.5 minutes or from 1.0 to 7.0 minutes.

In an embodiment of the disclosure, 15 to 60 weight percent of the total amount of ethylene copolymer made in the multi-zone reactor system is made in the first tubular reactor (reactor 1).

In an embodiment of the disclosure, 20 to 50 weight percent of the total amount of ethylene copolymer made in the multi-zone reactor system is made in the first tubular reactor (reactor 1).

In an embodiment of the disclosure, 30 to 40 weight percent of the total amount of ethylene copolymer made in the multi-zone reactor system is made in the first tubular reactor (reactor 1).

In an embodiment of the disclosure, 60 weight percent or less of the total amount of ethylene copolymer made in the multi-zone reactor system is made in the tank reactor (reactor 2).

In an embodiment of the disclosure, 50 weight percent or less of the total amount of ethylene copolymer made in the multi-zone reactor system is made in the tank reactor (reactor 2).

In an embodiment of the disclosure, about 10 weight percent of the total amount of ethylene copolymer made in the multi-zone reactor system is made in the second tubular reactor (reactor 3).

In an embodiment of the disclosure, less than 10 weight percent of the total amount of ethylene copolymer made in the multi-zone reactor system is made in the second tubular reactor (reactor 3).

In an embodiment of the disclosure, hydrogen is used in the solution phase polymerization process as a chain transfer agent.

In an embodiment of the disclosure, hydrogen is fed to both the inlet of the first tubular reactor (reactor 1) and to at least one location in the first tubular reactor (reactor 1) which is downstream from the inlet of the first tubular reactor.

In an embodiment of the disclosure, hydrogen is fed to both the inlet of the first tubular reactor (reactor 1) and to at least one location in the first tubular reactor (reactor 1) which is downstream from the inlet of the first tubular reactor and upstream of the inlet to the tank reactor (reactor 2).

In an embodiment of the disclosure, hydrogen is fed to both the inlet of the first tubular reactor (reactor 1) and to at least one location in the first tubular reactor (reactor 1) which is downstream from the inlet of the first tubular reactor and proximal to the inlet of the tank reactor (reactor 2).

In an embodiment of the disclosure, hydrogen is fed to both the inlet of the first tubular reactor (reactor 1) and to at least one location in the first tubular reactor (reactor 1) which is from 25 percent to 75 percent downstream from the inlet along the length of the first tubular reactor (to be clear, if the first tubular reactor has a length of 10 meters, the "at least one location in the first tubular reactor" to which hydrogen is fed, is at least one location in the tubular reactor which is 2.5 meters to 7.5 meters along the length of the tubular reactor, downstream from the tubular reactor inlet).

In an embodiment of the disclosure, hydrogen is fed to both the inlet of the first tubular reactor (reactor 1) and to at least one location in the first tubular reactor (reactor 1) which is from 35 percent to 65 percent downstream from the inlet along the length of the first tubular reactor (to be clear, if the first tubular reactor has a length of 10 meters, the "at least one location in the first tubular reactor" to which hydrogen is fed, is a location in the tubular reactor which is 3.5 meters to 6.5 meters along the length of the tubular reactor, downstream from the tubular reactor inlet).

In an embodiment of the disclosure, hydrogen is fed to both the inlet of the first tubular reactor (reactor 1) and to at least one location in the first tubular reactor (reactor 1) which is from 45 percent to 55 percent downstream from the inlet along the length of the first tubular reactor (to be clear, if the first tubular reactor has a length of 10 meters, the "at least one location in the first tubular reactor" to which hydrogen is fed, is a location in the tubular reactor which is 4.5 meters to 5.5 meters along the length of the tubular reactor, downstream from the tubular reactor inlet).

In an embodiment of the disclosure, hydrogen is fed to both the inlet of the first tubular reactor (reactor 1) and to at least one location in the first tubular reactor (reactor 1) which is from approximately 50 percent downstream from the inlet along the length of the first tubular reactor (to be clear, if the first tubular reactor has a length of 10 meters, the "at least one location in the first tubular reactor" to which hydrogen is fed, is a location in the tubular reactor which is about 5 meters along the length of the tubular reactor, downstream from the tubular reactor inlet).

In an embodiment of the disclosure, at least 60 weight percent of the total amount of hydrogen added to the multi-zone reactor system, is added to at least one location in the first tubular reactor which is downstream from the inlet of the first tubular reactor.

In an embodiment of the disclosure, at least 60 weight percent of the total amount of hydrogen added to the multi-zone reactor system, is added to at least one location in the first tubular reactor which is downstream from the inlet of the first tubular reactor and upstream of the inlet of the tank reactor (reactor 2).

In an embodiment of the disclosure, at least 60 weight percent of the total amount of hydrogen added to the multi-zone reactor system, is added to at least one location in the first tubular reactor which is downstream from the inlet of the first tubular reactor and proximal to the inlet of the tank reactor (reactor 2).

In an embodiment of the disclosure, at least 70 weight percent of the total amount of hydrogen added to the multi-zone reactor system, is added to at least one location in the first tubular reactor which is downstream from the inlet of the first tubular reactor.

In an embodiment of the disclosure, at least 70 weight percent of the total amount of hydrogen added to the multi-zone reactor system, is added to at least one location in the first tubular reactor which is downstream from the inlet of the first tubular reactor and upstream of the inlet of the tank reactor (reactor 2).

In an embodiment of the disclosure, at least 70 weight percent of the total amount of hydrogen added to the multi-zone reactor system, is added to at least one location in the first tubular reactor which is downstream from the inlet of the first tubular reactor and proximal to the inlet of the tank reactor (reactor 2).

In an embodiment of the disclosure, at least 80 weight percent of the total amount of hydrogen added to the multi-zone reactor system, is added to at least one location in the first tubular reactor which is downstream from the inlet of the first tubular reactor.

In an embodiment of the disclosure, at least 80 weight percent of the total amount of hydrogen added to the multi-zone reactor system, is added to at least one location in the first tubular reactor which is downstream from the inlet of the first tubular reactor and upstream of the inlet of the tank reactor (reactor 2).

In an embodiment of the disclosure, at least 80 weight percent of the total amount of hydrogen added to the multi-zone reactor system, is added to at least one location in the first tubular reactor which is downstream from the inlet of the first tubular reactor and proximal to the inlet of the tank reactor (reactor 2).

In embodiments of the disclosure, from 60 to 97, or from 65 to 95, or from 70 to 95, or from 70 to 90, or from 75 to 97, or from 75 to 95, or from 80 to 95, or from 80 to 90 weight percent of the total amount of hydrogen added to the multi-zone reactor system, is added to at least one location in the first tubular reactor which is downstream from the inlet of the first tubular reactor.

In embodiments of the disclosure, from 60 to 97, or from 65 to 95, or from 70 to 95, or from 70 to 90, or from 75 to 97, or from 75 to 95, or from 80 to 95, or from 80 to 90 weight percent of the total amount of hydrogen added to the multi-zone reactor system, is added to at least one location in the first tubular reactor which is downstream from the inlet of the first tubular reactor and upstream of the inlet of the tank reactor (reactor 2).

In embodiments of the disclosure, from 60 to 97, or from 65 to 95, or from 70 to 95, or from 70 to 90, or from 75 to 97, or from 75 to 95, or from 80 to 95, or from 80 to 90 weight percent of the total amount of hydrogen added to the multi-zone reactor system, is added to at least one location in the first tubular reactor which is downstream from the inlet of the first tubular reactor and proximal to the inlet of the tank reactor (reactor 2).

In an embodiment of the disclosure, at least 60 weight percent of the total amount of hydrogen added to the multi-zone reactor system, is added to at least one location in the first tubular reactor which is from 25 percent to 75 percent downstream from the inlet along the length of the first tubular reactor (to be clear, if the first tubular reactor has a length of 10 meters, the "at least one location in the first tubular reactor" to which hydrogen is fed, is a location in the tubular reactor which is 2.5 meters to 7.5 meters along the length of the tubular reactor, downstream from the tubular reactor inlet).

In an embodiment of the disclosure, at least 60 weight percent of the total amount of hydrogen added to the multi-zone reactor system, is added to at least one location in the first tubular reactor which is from 35 percent to 65 percent downstream from the inlet along the length of the first tubular reactor (to be clear, if the first tubular reactor has a length of 10 meters, the "at least one location in the first tubular reactor" to which hydrogen is fed, is a location in the tubular reactor which is 3.5 meters to 6.5 meters along the length of the tubular reactor, downstream from the tubular reactor inlet).

In an embodiment of the disclosure, at least 60 weight percent of the total amount of hydrogen added to the multi-zone reactor system, is added to at least one location in the first tubular reactor which is from 45 percent to 55 percent downstream from the inlet along the length of the first tubular reactor (to be clear, if the first tubular reactor has a length of 10 meters, the "at least one location in the first tubular reactor" to which hydrogen is fed, is a location in the tubular reactor which is 4.5 meters to 5.5 meters along the length of the tubular reactor, downstream from the tubular reactor inlet).

In an embodiment of the disclosure, at least 60 weight percent of the total amount of hydrogen added to the multi-zone reactor system, is added to at least one location in the first tubular reactor which is about 50 percent downstream from the inlet along the length of the first tubular reactor (to be clear, if the first tubular reactor has a length of 10 meters, the "at least one location in the first tubular reactor" to which hydrogen is fed, is a location in the tubular reactor which is about 5 meters along the length of the tubular reactor, downstream from the tubular reactor inlet).

In an embodiment of the disclosure, at least 70 weight percent of the total amount of hydrogen added to the multi-zone reactor system, is added to at least one location in the first tubular reactor which is from 25 percent to 75 percent downstream from the inlet along the length of the first tubular reactor (to be clear, if the first tubular reactor has a length of 10 meters, the "at least one location in the first tubular reactor" to which hydrogen is fed, is a location in the tubular reactor which is 2.5 meters to 7.5 meters along the length of the tubular reactor, downstream from the tubular reactor inlet).

In an embodiment of the disclosure, at least 70 weight percent of the total amount of hydrogen added to the multi-zone reactor system, is added to at least one location in the first tubular reactor which is from 35 percent to 65 percent downstream from the inlet along the length of the first tubular reactor (to be clear, if the first tubular reactor has a length of 10 meters, the "at least one location in the first tubular reactor" to which hydrogen is fed, is a location in the tubular reactor which is 3.5 meters to 6.5 meters along the length of the tubular reactor, downstream from the tubular reactor inlet).

In an embodiment of the disclosure, at least 70 weight percent of the total amount of hydrogen added to the multi-zone reactor system, is added to at least one location in the first tubular reactor which is from 45 percent to 55 percent downstream from the inlet along the length of the first tubular reactor (to be clear, if the first tubular reactor has a length of 10 meters, the "at least one location in the first tubular reactor" to which hydrogen is fed, is a location in the tubular reactor which is 4.5 meters to 5.5 meters along the length of the tubular reactor, downstream from the tubular reactor inlet).

In an embodiment of the disclosure, at least 70 weight percent of the total amount of hydrogen added to the multi-zone reactor system, is added to at least one location in the first tubular reactor which is about 50 percent downstream from the inlet along the length of the first tubular reactor (to be clear, if the first tubular reactor has a length of 10 meters, the "at least one location in the first tubular reactor" to which hydrogen is fed, is a location in the tubular reactor which is about 5 meters along the length of the tubular reactor, downstream from the tubular reactor inlet).

In an embodiment of the disclosure, at least 80 weight percent of the total amount of hydrogen added to the multi-zone reactor system, is added to at least one location in the first tubular reactor which is from 25 percent to 75 percent downstream from the inlet along the length of the first tubular reactor (to be clear, if the first tubular reactor has a length of 10 meters, the "at least one location in the first tubular reactor" to which hydrogen is fed, is a location in the tubular reactor which is 2.5 meters to 7.5 meters along the length of the tubular reactor, downstream from the tubular reactor inlet).

In an embodiment of the disclosure, at least 80 weight percent of the total amount of hydrogen added to the multi-zone reactor system, is added to at least one location in the first tubular reactor which is from 35 percent to 65 percent downstream from the inlet along the length of the first tubular reactor (to be clear, if the first tubular reactor has a length of 10 meters, the "at least one location in the first tubular reactor" to which hydrogen is fed, is a location in the tubular reactor which is 3.5 meters to 6.5 meters along the length of the tubular reactor, downstream from the tubular reactor inlet).

In an embodiment of the disclosure, at least 80 weight percent of the total amount of hydrogen added to the multi-zone reactor system, is added to at least one location in the first tubular reactor which is from 45 percent to 55 percent downstream from the inlet along the length of the first tubular reactor (to be clear, if the first tubular reactor has a length of 10 meters, the "at least one location in the first tubular reactor" to which hydrogen is fed, is a location in the tubular reactor which is 4.5 meters to 5.5 meters along the length of the tubular reactor, downstream from the tubular reactor inlet).

In an embodiment of the disclosure, at least 80 weight percent of the total amount of hydrogen added to the multi-zone reactor system, is added to at least one location in the first tubular reactor which is about 50 percent downstream from the inlet along the length of the first tubular reactor (to be clear, if the first tubular reactor has a length of 10 meters, the "at least one location in the first tubular reactor" to which hydrogen is fed, is a location in the tubular reactor which is about 5 meters along the length of the tubular reactor, downstream from the tubular reactor inlet).

In embodiments of the disclosure, from 60 to 97, or from 65 to 95, or from 70 to 95, or from 70 to 90, or from 75 to 97, or from 75 to 95, or from 80 to 95, or from 80 to 90 weight percent of the total amount of hydrogen added to the multi-zone reactor system, is added to at least one location in the first tubular reactor which is from 25 percent to 75 percent downstream from the inlet along the length of the first tubular reactor (to be clear, if the first tubular reactor has a length of 10 meters, the "at least one location in the first tubular reactor" to which hydrogen is fed, is a location in the tubular reactor which is 2.5 meters to 7.5 meters along the length of the tubular reactor, downstream from the tubular reactor inlet).

In embodiments of the disclosure, from 60 to 97, or from 65 to 95, or from 70 to 95, or from 70 to 90, or from 75 to 97, or from 75 to 95, or from 80 to 95, or from 80 to 90 weight percent of the total amount of hydrogen added to the multi-zone reactor system, is added to at least one location in the first tubular reactor which is from 35 percent to 65 percent downstream from the inlet along the length of the first tubular reactor (to be clear, if the first tubular reactor has a length of 10 meters, the "at least one location in the first tubular reactor" to which hydrogen is fed, is a location in the tubular reactor which is 3.5 meters to 6.5 meters along the length of the tubular reactor, downstream from the tubular reactor inlet).

In embodiments of the disclosure, from 60 to 97, or from 65 to 95, or from 70 to 95, or from 70 to 90, or from 75 to 97, or from 75 to 95, or from 80 to 95, or from 80 to 90 weight percent of the total amount of hydrogen added to the multi-zone reactor system, is added to at least one location in the first tubular reactor which is from 45 percent to 55 percent downstream from the inlet along the length of the first tubular reactor (to be clear, if the first tubular reactor has a length of 10 meters, the "at least one location in the first tubular reactor" to which hydrogen is fed, is a location in the tubular reactor which is 4.5 meters to 5.5 meters along the length of the tubular reactor, downstream from the tubular reactor inlet).

In embodiments of the disclosure, from 60 to 97, or from 65 to 95, or from 70 to 95, or from 70 to 90, or from 75 to 97, or from 75 to 95, or from 80 to 95, or from 80 to 90 weight percent of the total amount of hydrogen added to the multi-zone reactor system, is added to at least one location in the first tubular reactor which is about 50 percent downstream from the inlet along the length of the first tubular reactor (to be clear, if the first tubular reactor has a length of 10 meters, the "at least one location in the first tubular reactor" to which hydrogen is fed, is a location in the tubular reactor which is about 5 meters along the length of the tubular reactor, downstream from the tubular reactor inlet).

In embodiments of the disclosure, the solution phase polymerization process may be carried out at temperatures of from 105° C. to 320° C., or from 130° C. to 250° C., or from 140° C. to 230° C.

In embodiments of the disclosure, the solution phase polymerization process may be carried out at pressures of from about 4 to about 20 MPa, or from about 8 to about 20 MPa.

In embodiments of the disclosure, the temperature within the first tubular reactor (reactor 1) ranges from 50 to 250° C., or from 60 to 230° C., or from 75 to 230° C. In embodiments of the disclosure, the temperature rise over the length of the first tubular reactor (reactor 1) is from 20 to 150° C., or from 20 to 120° C.

In embodiments of the disclosure, the temperature within the tank reactor (reactor 2) is from 150 to 320° C., or from 200 to 275° C.

In embodiments of the disclosure, the pressure within the first tubular reactor (reactor 1) is from 8 to 20 MPa, or from 10 to 20 MPa, or from 12 to 16 MPa.

In embodiments of the disclosure, the pressure within the tank reactor (reactor 2) is from 8 to 20 MPa, or from 10 to 20 MPa, or from 12 to 16 MPa.

In embodiments of the disclosure, the first tubular reactor (reactor 1) has a volume of from 250 to 5,000 liters, or from 350 to 2,500 liters, or from 350 to 1,000 liters, or from 400 to 1,000 liters.

In embodiments of the disclosure, the first tubular reactor (reactor 1) has a length to diameter ratio of from 50 to 1000, or from 50 to 750, or from 75 to 500, or from 100 to 500, or from 200 to 400.

In embodiments of the disclosure, the tank reactor (reactor 2) has a volume of from 500 to 5,000 liters, or from 1,000 to 5,000 liters, or from 1,500 to 5,000 liters, or from 2,000 to 5,000 liters, or from 2,500 to 4,500 liters.

In embodiments of the disclosure, the second tubular reactor (reactor 3) has a volume of from 250 to 5,000 liters, or from 500 to 4,000 liters, or from 1,000 to 3,500 liters, or from 1500 to 4,000 liters, or from 1,500 to 3,500 liters.

In embodiments of the disclosure, the second tubular reactor (reactor 3) has a length to diameter ratio of from 50 to 1,000, or from 50 to 750, or from 75 to 500, or from 100 to 500, or from 150 to 350.

In embodiments of the disclosure, the ratio of the volume of the first tubular reactor (reactor 1) to the volume of the tank reactor (reactor 2) is from 1:15 to 2:1, or from 1:10 to 1:1, or from 1:7.5 to 1:1, or from 1:5 to 1:1.

In embodiments of the disclosure, the ratio of the volume of the first tubular reactor (reactor 1) to the volume of the second tubular reactor (reactor 3) is from 1:15 to 2:1, or from 1:10 to 1:1 or from 1:7.5 to 1:1, or from 1:5 to 1:1.

In embodiments of the disclosure, the volume of the second tubular reactor (reactor 3) is from about 60 to about 120 percent of the volume of the tank reactor (reactor 2), or from about 70 to about 100 percent of the volume of the tank reactor (reactor 2), or from about 75 to 95 of the volume of the tank reactor (reactor 2), or from about 75 to 85 percent of the volume of the tank reactor (reactor 2), or about 80 percent of the volume of the tank reactor (reactor 2).

In an embodiment of the disclosure, the pressure and temperature are maintained within the multi-zone reactor system at temperature and a pressure at which the ethylene copolymer formed remains in solution.

In embodiments of the disclosure, the molecular weight (and hence melt index, $I_2$) and the molecular weight distribution ($M_w/M_n$) of an ethylene copolymer made with a multi-zone reactor system can may be adjusted by: i) altering the inlet temperature of the first tubular reactor (i.e. the temperature at which the polymerization process feed streams enter the upstream end of the first tubular reactor, such as for example the polymerization solvent temperature, and the monomer temperature); ii) altering the amount of hydrogen fed to the process and/or changing the locations at which hydrogen is fed to the multi-zone reactor system and/or changing the amount of hydrogen fed to each location at which it is fed to the multi-zone reactor system; and iii) altering the ethylene conversion overall or the ethylene conversion occurring within the first tubular reactor, by changing the polymerization catalyst feed rate.

In further embodiments of the disclosure, the ethylene copolymer molecular weight and molecular weight distribution may be adjusted by altering: the catalyst composition, such as the molar ratio of the cocatalyst to the pre-catalytic components; the mean temperatures of the first tubular reactor, the tank reactor, and/or the second tubular reactor; the temperature at the inlet or outlet of the first tubular reactor, the tank reactor and/or the second tubular reactor; and the ethylene conversion in the tank reactor and/or the second tubular reactor.

In an embodiment of the disclosure, the inlet temperature (or the temperature of the feed mixture comprising solvent, monomers and catalyst components entering the inlet) of the first tubular reactor (reactor 1) is from 30° C. to 150° C. In further embodiments of the disclosure, the inlet temperature of the first tubular reactor (reactor 1) is from 75° C. to 150° C., or from 90° C. to 150° C., or from 75° C. to 130° C., or from 90° C. to 125° C.

In embodiments of the disclosure, the inlet temperature of the first tubular reactor (reactor 1) is less than 150° C., or less than 140° C., or less than 130° C., or less than 125° C.

In an embodiments of the disclosure, at least 70 weight percent, or least 75 weight percent, or at least 80 weight percent, or at least 85 weight percent, or at least 90 weight percent of the ethylene that is fed to the multi-zone reactor system is converted to ethylene copolymer (i.e. the ethylene conversion is ≥70%, or ≥75%, or ≥80%, or ≥85%, or ≥90%).

The Polymerization Catalyst

In an embodiment of the disclosure the ethylene copolymer is made in the presence of a Ziegler-Natta polymerization catalyst examples of which are well known to persons skilled in the art.

In an embodiment of the disclosure the ethylene copolymer is made in the presence of a Ziegler-Natta polymerization catalyst comprising vanadium and titanium and aluminum.

In an embodiment of the disclosure, the active Ziegler-Natta polymerization catalyst comprises three catalyst components: (i) a vanadium precatalytic compound, $VOCl_3$; (ii) a titanium precatalytic compound, titanium tetrahalide, $TiX_4$, where X is a halide; and (iii) a cocatalytic compound which is a trialkylaluminum, $(R^1)_3Al$ compound, or an alkylaluminum alkoxide compound, $R^2AlOR^3$, where $R^1$, $R^2$ and $R^3$ are each a $C_{1-10}$ hydrocarbyl group, such as for example, an alkyl group.

In an embodiment, the titanium precatalytic compound (ii) is titanium tetrachloride, $TiCl_4$.

In an embodiment, the cocatalytic compound (iii) is triethylaluminum, $(C_2H_5)_3Al$.

In an embodiment of the disclosure, the molar ratio of precatalytic compounds, (i) $VOCl_3$ to (ii) $TiX_4$ used to make the active Zielger-Natta catalyst is such that the molar ratio of V:Ti is from 5:95 to 70:30.

In an embodiment of the disclosure, the molar ratio of aluminum from the cocatalyst compound, (iii) $(R^1)_3Al$ or $R^2AlOR^3$ to the total metal provided by the precatalytic compounds (i) $VOCl_3$ and (ii) $TiX_4$ used to make the active Zielger-Natta polymerization catalyst is such that the molar ratio of Al: V+Ti is from 0.1:1 to 100:1, or from 0.5:1 to 50:1, or from 0.5:1 to 25:1, or from 0.5:1 to 10:1, or from 0.5:1 to 5:1, or from 0.75:1 to 10:1, or from 0.75:1 to 5:1.

In an embodiment, the active Ziegler-Natta polymerization catalyst is prepared on-line by first mixing components (i) and (ii) and then adding component (iii).

In embodiments, the active Zielger-Natta polymerization catalyst is prepared in-line by mixing the catalysts components (i), (ii) and (iii) in the presence of a solvent and/or a diluent at a temperature of from 20° C. to 150° C., or from 20° C. to 100° C., or from 75° C. to 150° C., or from 80° C. to 100° C.

In an embodiment, the active Zielger-Natta polymerization catalyst is prepared on-line by mixing the catalysts components (i), (ii) and (iii) in the presence of a solvent and/or a diluent for a time of from 0.5 to 30 minutes, or from 0.5 to 15 minutes, or from 0.5 to 10 minutes, or from 0.3 to 3 minutes, prior to feeding the active catalyst to a polymerization zone or reactor.

In embodiments of the disclosure, the $VOCl_3$ and $TiCl_4$ compounds were first combined in the presence of a solvent and/or diluent in a weight ratio (weight percent $VOCl_3$: weight percent $TiCl_4$) of from 50:50 to 90:10, or from 60:40 to 85:15, or from 60:40 to 80:20 and then combined with triethylaluminum just prior to injection into the first tubular reactor at the inlet of the first tubular reactor.

In an embodiment of the disclosure, the $VOCl_3$ and $TiCl_4$ compounds were first combined in the presence of a solvent and/or diluent in a weight ratio of from 80:20 and then combined with triethylaluminum just prior to injection into the first tubular reactor at the inlet of the first tubular reactor.

In an embodiment, the solvent used in the preparation of the active Ziegler-Natta polymerization catalyst is an inert $C_{6-10}$ hydrocarbon which may be unsubstituted or substituted by a $C_{1-4}$ alkyl group. Non-limiting examples of suitable solvents which can be used in embodiments of the disclosure include hexane, heptane, octane, cyclohexane, methylcyclohexane and hydrogenated naphtha.

In an embodiment of the disclosure, the solvent used in the preparation of the active Ziegler-Natta polymerization catalyst is the same as that fed to the multi-zone reactor system for the solution phase polymerization process.

The Ethylene Copolymer

In an embodiment of the disclosure, the ethylene copolymer is made with a multi-site catalyst system, non-limiting examples of which include Ziegler-Natta polymerization catalysts and chromium catalysts, both of which are well known in the art.

In an embodiment of the disclosure, the ethylene copolymer is made with a Ziegler-Natta polymerization catalyst which is well known in the art.

In embodiments of the disclosure, alpha-olefins which may be copolymerized with ethylene to make the ethylene copolymer may be selected from the group comprising 1-butene, 1-pentene, 1-hexene and 1-octene and mixtures thereof.

In an embodiment of the disclosure, the ethylene copolymer comprises ethylene and at least one alpha olefin having from 4 to 8 carbon atoms.

In an embodiment of the disclosure, the ethylene copolymer is an ethylene/1-butene copolymer.

In embodiments of the disclosure, the ethylene copolymer has a density of from 0.940 to 0.965 g/cm$^3$, or from 0.940 to 0.963 g/cm$^3$, or from 0.940 to 0.960 g/cm$^3$, or from 0.940 to 0.958 g/cm$^3$, or from 0.940 to 0.956 g/cm$^3$, or from 0.940 to 0.952 g/cm$^3$, or from 0.940 to 0.950 g/cm$^3$, or from 0.942 to 0.960 g/cm$^3$, or from 0.942 to 0.958 g/cm$^3$, or from 0.942 to 0.956 g/cm$^3$, or from 0.942 to 0.952 g/cm$^3$, or from 0.942 to 0.950 g/cm$^3$.

In embodiments of the disclosure the melt index, $I_2$ of the ethylene copolymer will be at least 0.50 g/10 min, or at least 0.75 g/10 min, or at least 0.80 g/10 min, or at least 1.0 g/10 min.

In embodiments of the disclosure the melt index, $I_2$ of the ethylene copolymer may be from about 0.01 g/10 min to about 10.0 g/10 min, or from about 0.1 g/10 min to about 10.0 g/10 min, or from about 0.1 g/10 min to about 5.0 g/10 min, or from about 0.1 g/10 min to about 3.0 g/10 min, or from about 0.5 g/10 min to about 5.0 g/10 min, or from about 0.5 g/10 min to about 3.0 g/min, or from about 0.5 g/10 min to about 2.5 g/10 min.

In embodiments of the disclosure the melt flow ratio (MFR), $I_{21}/I_2$ of the ethylene copolymer is greater than 50, or greater than 60, or greater than 65 or greater than 70, or greater than 75.

In an embodiment of the disclosure the melt flow ratio (MFR), $I_{21}/I_2$ of the ethylene copolymer is less than 115.

In embodiments of the disclosure the melt flow ratio (MFR), $I_{21}/I_2$ of the ethylene copolymer is from 50 to 120, or from 50 to 115, or from greater than 65 to less than 115, or from greater than 75 to less than 115.

In an embodiment of the disclosure, the ethylene copolymer has a number average molecular weight, $M_n$ of from about 5,000 to about 75,000, or from about 5,000 to about 50,000, or from about 5,000 to about 30,000, or from about 5,000 to about 25,000, or from about 7,500 to about 50,000, or from about 7,500 to about 30,000, or from about 7,500 to about 25,000, or from about 5,000 to about 20,000, or from about 5,000 to about 15,000, or from about 7,500 to about 20,000, or from about 7,500 to about 15,000, or from about 10,000 to about 15,000, or from about 10,000 to about 12,500, or from about 11,000 to about 15,000, or from about 11,000 to about 12,500, or from greater than 11,000 to less than 12,500, or from greater than 11,000 to less than 15,000.

In an embodiment of the disclosure, the ethylene copolymer has a weight average molecular weight, $M_w$ of from about 75,000 to about 250,000, or from about 80,000 to about 200,000, or from about 90,000 to about 175,000, or from about 100,000 to about 175,000, or from about 90,000 to about 150,000, or from about 100,000 to about 150,000, or from about 100,000 to about 125,000, or from about 90,000 to about 130,000, or from about 90,000 to about 125,000, or from about 85,000 to about 140,000, or from about 85,000 to about 150,000, or from greater than about 85,000 to less than about 140,000.

In an embodiment of the disclosure, the ethylene copolymer has a Z-average molecular weight, $M_z$ of at least 500,000, or greater than 500,000, or at least 550,000, or greater than 550,000, or at least 600,000, or greater than 600,000.

In an embodiment of the disclosure, the ethylene copolymer has a Z-average molecular weight, $M_z$ of from about 500,000 to about 800,000, or from greater than 500,000 to about 800,000, or from greater than 500,000 to less than 800,000, or from about 500,000 to 750,000, or from about 525,000 to about 750,000, or from about 550,000 to about 750,000, or from about 575,000 to about 750,000, or from about 550,000 to about 725,000, or from about 575,000 to about 725,000, or from about 600,000 to about 700,000.

In embodiments of the disclosure, the ethylene copolymer has a has a molecular weight distribution, $M_w/M_n$ of from 8.0 to 12.0, or from greater than 8.0 to 12.0, or from 8.5 to 12.0, or from 9.0 to 12.0, or from greater than 9.0 to less than 12.0, or from 9.0 to 11.5, or from 8.5 to 11.5, or from 9.0 to 11.0, or from 8.0 to 11.0, or from 9.0 to 10.5, or from 9.5 to 10.5.

In embodiments of the disclosure, the ethylene copolymer has a Z-average molecular weight distribution, $M_z/M_w$ of from 3.5 to 8.0, or from 4.0 to 8.0, or from 4.0 to 7.5, or from 4.0 to 7.0, or from 4.5 to 7.5, or from 4.5 to 7.0, or from 4.5 to 6.5, or from 5.0 to 7.0, or from 5.5 to 7.0, or from 5.0 to 6.5, or from 5.5 to 6.5, or from greater than 5.0 to below 6.5, or from 5.0 to 6.25, or from 5.0 to 6.0.

In an embodiment of the disclosure, the ethylene copolymer has a stress exponent, defined as $\text{Log}_{10}[I_6/I_2]/\text{Log}_{10}[6.48/2.16]$, which is from 1.60 to 2.00, or from 1.65 to 2.00, or from 1.70 to 2.00, or from 1.75 to 1.95, or from 1.75 to 1.90, or from 1.80 to 1.95, or from 1.80 to 1.90, or from greater than 1.80 to less than 1.90.

In an embodiment of the disclosure, the ethylene copolymer is characterized by having a high $M_z$, of about 500,000 or higher, and broad molecular weight distribution $(M_w/M_n)$, of from about 9.0 to about 12.0.

In embodiments of the disclosure, the ethylene copolymer has a composition distribution breadth index, $\text{CDBI}_{50}$ of from 40 to 75 weight %, or from 50 to 70 weight %, or from 55 to 70 weight %, or from 55 to 65 weight %.

In embodiments of the disclosure, the ethylene copolymer has a composition distribution breadth index, $\text{CDBI}_{25}$ of from 35 to 65 weight %, or from 35 to 60 weight %, or from 35 to 55 weight %, or from 40 to 60 weight %, or from 40 to 55 weight %, or from 40 to 50 weight %, or from greater than 40 weight % to less than 50 weight %.

In an embodiment of the disclosure, the ethylene copolymer has a unimodal profile in a gel permeation chromatograph, GPC. The term "unimodal" is herein defined to mean there will be only one significant peak or maximum evident in the GPC-curve. A unimodal profile includes a broad unimodal profile, and a unimodal profile may also contain shoulders, or buried peaks, that cannot be easily separated, or deconvoluted into well-defined unique peaks.

In an embodiment of the disclosure, the ethylene copolymer will have a normal comonomer distribution profile as measured using GPC-FTIR. If the comonomer incorporation decreases with molecular weight, as measured using GPC-FTIR, the distribution is described as "normal". The term "normal comonomer distribution" then is used herein to mean, that across the molecular weight range of the ethylene copolymer, comonomer contents for the various polymer fractions are not substantially uniform and the higher molecular weight fractions thereof have proportionally lower comonomer contents. If the comonomer incorporation is approximately constant with molecular weight, as measured using GPC-FTIR, the comonomer distribution is described as "flat" or "uniform". The terms "reverse comonomer distribution" and "partially reverse comonomer distribution" mean that in the GPC-FTIR data obtained for the copolymer, there is one or more higher molecular weight components having a higher comonomer incorporation than in one or more lower molecular weight components. The term "reverse(d) comonomer distribution" is used herein to mean, that across the molecular weight range of the ethylene copolymer, comonomer contents for the various polymer fractions are not substantially uniform and the higher molecular weight fractions thereof have proportionally higher comonomer contents (i.e. if the comonomer incorporation rises with molecular weight, the distribution is described as "reverse" or "reversed"). Where the comonomer incorporation rises with increasing molecular weight and then declines, the comonomer distribution is still considered "reverse", but may also be described as "partially reverse".

In an embodiment, the ethylene copolymer contains catalyst residues that reflect the chemical composition of the catalyst formulation used to make it. Those skilled in the art will understand that catalyst residues are typically quantified by the parts per million of metal, in for example the ethylene copolymer where the metal present originates from the metal in the catalyst formulation used to make it. Non-limiting examples of the metal residue which may be present include Group 4 to 6 metals, such as titanium, zirconium, hafnium and vanadium.

In embodiments of the disclosure, the ethylene copolymer has at least 0.050 ppm of titanium, or at least 0.100 ppm of titanium, or at least 0.250 ppm of titanium, or at least 0.300 ppm of titanium (based on the weight of the ethylene copolymer).

In embodiments of the disclosure, the ethylene copolymer has from 0.050 to 3.0 ppm of titanium, or from 0.050 to 2.5 ppm of titanium, or from 0.050 to 2.0 ppm of titanium, or from 0.050 to 1.5 ppm of titanium, or from 0.050 to 1.0 ppm of titanium or from 0.100 to 3.0 ppm of titanium, or from 0.100 to 2.5 ppm of titanium, or from 0.100 to 2.0 ppm of titanium, or from 0.100 to 1.5 ppm of titanium, or from 0.100 to 1.0 ppm of titanium, or from 0.250 to 3.0 ppm of titanium, or from 0.250 to 2.0 ppm of titanium, or from 0.250 to 1.5 ppm of titanium, or from 0.250 to 1.0 ppm of titanium (based on the weight of the ethylene copolymer).

In embodiments of the disclosure, the ethylene copolymer has at least 0.050 ppm of vanadium, or at least 0.100 ppm of vanadium, or at least 0.200 ppm of vanadium, or at least 0.250 ppm of vanadium, or at least 0.300 ppm of vanadium (based on the weight of the ethylene copolymer).

In embodiments of the disclosure, the ethylene copolymer has from 0.050 to 3.0 ppm of vanadium, or from 0.050 to 2.5 ppm of vanadium, or from 0.050 to 2.0 ppm of vanadium, or from 0.050 to 1.5 ppm of vanadium, or from 0.050 to 1.0 ppm of vanadium, or from 0.100 to 3.0 ppm of vanadium, or from 0.100 to 2.5 ppm of vanadium, or from 0.100 to 2.0 ppm of vanadium, or from 0.100 to 1.5 ppm of vanadium, or from 0.100 to 1.0 ppm of vanadium, or from 0.200 to 3.0 ppm of vanadium, or from 0.200 to 2.0 ppm of vanadium, or from 0.200 to 1.5 ppm of vanadium, or from 0.200 to 1.0 ppm of vanadium (based on the weight of the ethylene copolymer).

In an embodiment of the disclosure, the ethylene copolymer has no long chain branches or will contain no measurable amounts of long chain branches ("LCB"). LCB is a well-known structural phenomenon in ethylene copolymers and well known to those of ordinary skill in the art. Traditionally, there are three methods for LCB analysis, namely, nuclear magnetic resonance spectroscopy (NMR), for example see J. C. Randall, J Macromol. Sci., Rev. Macromol. Chem. Phys. 1989, 29, 201; triple detection SEC equipped with a DRI, a viscometer and a low-angle laser light scattering detector, for example see W. W. Yau and D. R. Hill, Int. J. Polym. Anal. Charact. 1996; 2:151; and rheology, for example see W. W. Graessley, Acc. Chem. Res. 1977, 10, 332-339.

In an embodiment of the disclosure, an ethylene copolymer is made which is characterized by having a Mz of above about 500,000, a molecular weight distribution ($M_w/M_n$) of from about 9.0 to about 12.0 and a melt index of above 0.5 g/10 min. Without wishing to be bound by theory, and as shown in the accompanying examples, we have observed that these ethylene copolymer properties may be achieved when using the above described multi-zone reactor system and by carefully manipulating the amount and location of hydrogen addition throughout the multi-zone reactor system.

The Biaxial Orientation Process

In an embodiment of the disclosure, a biaxially oriented polyethylene film or biaxially oriented polyethylene film structure comprises the ethylene copolymer made according to the present disclosure.

A biaxially oriented polyethylene (BOPE) film or film structure may in an embodiment of the disclosure be made using a tenter frame process.

The tenter frame process is commonly used to prepare biaxially oriented film and is suitable for the present invention. The tenter frame process is well known to persons skilled in the art of film making. The process begins with an extruder that is equipped with a slot die to form a sheet or film. For convenience, this extruded sheet or film may be referred to as the "base film" or "base film structure" or "base structure". Once the base structure has been quenched on chill rolls, machine direction (MD) stretching or machine direction orientation (MDO) is accomplished by pulling the base structure using several rolls that rotate with progressively increasing surface speeds. Following MD stretching, clips (that are attached to chains) grip the edges of the moving sheet (or film, or web) and carry it into an oven. In the oven, the edges of the base structure are drawn apart making the sheet wider, thus providing transverse direction orientation (TDO). The orientation/stretching causes the film structure to become thinner, proportionally to the orientation or stretch ratios. For example, to prepare a 1-mil finished BOPE film with a 5:1 stretch ratio in the machine direction (MD) and a 8:1 stretch ratio in the transversion direction (TD), the process must start out with a 40-mil thick film or sheet. Note that in embodiments of the disclosure, the stretch ratio in the machine direction (MD) may range from about 5:1 to about 9:1 while the stretch ratio in the transversion direction (TD) may range from about 7:1 to 12:1. Further details are provided by Kanai T., et al. in the textbook "Film Processing Advances" (2014); Hanser Publishers.

Biaxial orientation may improve toughness, barrier, optics, heat resistance, and stiffness of films. However, conventional polyethylene is generally not considered to be well suited to the tenter frame process as it may have poor stretchability, compared to for example polypropylene (PP) or polyethylene terephthalate (PET).

In an embodiment, the ethylene copolymer made according to the present disclosure is used to make a BOPE film or film structure.

In an embodiment, a BOPE film or film structure is made with from 60 to 100 weight % of the ethylene copolymer made according to the present disclosure. In an embodiment, a BOPE film or film structure is made with from 70 to 90 weight % of the ethylene copolymer made according to the present disclosure. In an embodiment, a BOPE film is made with from 80 to 95 weight % of the ethylene copolymer made according to the present disclosure.

In an embodiment, a BOPE film or film structure is made with from 60 to 100 weight % of the ethylene copolymer made according to the present disclosure, while the remaining polymer(s) used to prepare the BOPE film or film structure is also a polyethylene. In an embodiment, a BOPE film or film structure is made with from 70 to 90 weight % of the ethylene copolymer made according to the present disclosure while the remaining polymer(s) used to prepare the BOPE film or film structure is also a polyethylene. In an embodiment, a BOPE film is made with from 80 to 95 weight % of the ethylene copolymer made according to the present disclosure while the remaining polymer(s) used to prepare the BOPE film or film structure is also a polyethylene. Without wishing to be bound by theory, use of only polyethylene to prepare a BOPE film or film structure allows the film to be more easily recycled in comparison to a film made with a mixture of polymers.

It is known in the art of preparing BOPE films to use blends of polymers and this is also contemplated in certain embodiments of the present disclosure. Hence, in an embodiment of the disclosure, a BOPE film or film structure is prepared from a polymer blend composition comprising at least 60 weight % of the ethylene copolymer made according to the present disclosure.

Some non-limiting examples of other polymers which in embodiments of the disclosure are suitable for use in blends with the ethylene copolymer include: Linear Low Density Polyethylene (LLDPE); Medium Density Polyethylene (MDPE); High Density Polyethylene (HDPE); Very Low Density Polyethylene (VLDPE), including elastomers and plastomers; and High Pressure Low Density Polyethylene (HPLDPE) which is prepared by the free radical polymerization of ethylene.

In embodiments of the disclosure, a LLDPE used in a polymer blend with the ethylene copolymer has a melt index ($I_2$) of from 0.1 to 10 g/10 min, or from 0.9 to 2.3 g/10 min, and a density of from about 0.910 to about 0.935 g/cm$^3$.

In embodiments of the disclosure, a VLPDE used in a polymer blend with the ethylene copolymer has a melt index ($I_2$) of from 0.1 to 10 g/10 min, or from 0.9 to 2.3 g/10 min, and a density of from about 0.890 to about 0.910 g/cm$^3$.

In embodiments of the disclosure, a MDPE used in a polymer blend with the ethylene copolymer has a melt index ($I_2$) of from 0.1 to 10 g/10 min, or from 0.9 to 2.3 g/10 min, and a density of from about 0.936 to about 0.949 g/cm$^3$.

In embodiments of the disclosure, a HDPE used in a polymer blend with the ethylene copolymer has a melt index ($I_2$) of from 0.1 to 10 g/10 min, or from 0.4 to 0.9 g/10 min and a density of at least about 0.95 g/cm$^3$.

In an embodiment of the disclosure, the HPLDPE used in a polymer blend with the ethylene copolymer has a melt index ($I_2$) of from 0.1 to 10 g/10 min and a density of from about 0.92 to about 0.94 g/cm$^3$.

It is known in the art of preparing BOPE films to use a multi-layer film or film structure as the (unstretched) starting film. These starting films are comparatively thick before being stretched and are often referred to as a "sheet" instead of a film. For convenience, such an unstretched, multi-layer sheet may be referred to as a "base film" or "base film structure" or "base structure".

In an embodiment of the disclosure a suitable base film structure will comprise at least 60 weight % of the ethylene copolymer made as described herein (based on the total weight of the base film structure).

In an embodiment of the disclosure, the ethylene copolymer made as described herein is used as a "core" layer in a suitable base film structure (i.e. as interior layer of a multi-layer base film structure).

Examples of polymers that may be used to prepare other layers include the LLDPE, MDPE, HDPE, VLPDE and HPLDPE described above.

In an embodiment of the disclosure, the multi-layer base film structure contains at least three layers including two skin layers (i.e. the layers on each exterior surface of the base film structure) and one or more core layers.

In an embodiment of the disclosure, one skin layer may be made from HDPE while the other skin layer is a seal layer, as disclosed in published U.S. Pat. No. 9,676,169.

In an embodiment of the disclosure, the seal layer may comprise: a linear low density polyethylene, LLDPE (such as for example a LLDPE made with a so called metallocene catalyst, which are well known to persons skilled in the art); a plastomer; an elastomer; or blends thereof.

In an embodiment, a plastomer comprising polymerized ethylene and 1-octene monomers (and blends thereof with a LLDPE, a HDPE and/or HPLDPE) may also be used in a seal layer.

In an embodiment of the disclosure, it is also contemplated to use a plastomer (or polymer blends thereof) in both skin layers of a BOPE film.

Without wishing to be bound by theory, the use of plastomers in a skin layer may improve the optical properties of a BOPE film.

In an embodiment of the disclosure, a BOPE film has a core layer comprising the ethylene copolymer made as described herein while both skin layers comprise a plastomer comprising polymerized ethylene and 1-octene monomers.

In an embodiment of the disclosure, a BOPE film has a core layer comprising the ethylene copolymer made as described herein while both skin layers also comprise an ethylene copolymer made as described herein.

In an embodiment of the disclosure, a multilayer structure that contains at least 5 layers has two external skin layers made from a plastomer and two "adjacent-to-skin" layers that are made from a blend of a plastomer and a polyethylene having a higher density than the plastomer.

It is known to use a layer of a "barrier resin" to improve the barrier properties of BOPE films. Non-limiting examples of suitable barrier resins include Ethylene-Vinyl Alcohol (EVOH) and polyamide.

The polymers used in the present disclosure (including the ethylene copolymer made as described herein) will in specific embodiments contain an antioxidant (such as a hindered phenol; a phosphite or a blend of both) in conventional amounts, as is well known to those skilled in the art. Other, optional additives which can be added to a polymer (including the ethylene copolymer made as described herein) in specific embodiments include anti-blocking agents, slip agents and nucleating agents (such as those disclosed in U.S. Pat. No. 9,676,169). The use of zinc glycerolate as an optional nucleating agent is also contemplated for use in specific embodiments of the disclosure (note: the zinc glycerolate nucleating agent is commercially available, under the trademark IRGASTAB® 287).

The BOPE films prepared according to this disclosure may be suitable for use in a wide variety of packaging applications. In an embodiment, the BOPE film may be used in a laminated structure—for example, the BOPE film may be used as the print web when laminated to a sealant web made from a lower density polyethylene. This type of laminated structure may be more easily recycled in comparison to conventional laminated structures that contain a layer of polyester or polypropylene that is laminated to a layer of polyethylene.

The following examples are presented for the purpose of illustrating selected embodiments of this disclosure; it being understood, that the examples presented do not limit the claims presented.

EXAMPLES

Polymer Characterization and Test Methods

Prior to testing, each polymer specimen was conditioned for at least 24 hours at 23±2° C. and 50±10% relative humidity and subsequent testing was conducted at 23±2° C. and 50±10% relative humidity. Herein, the term "ASTM conditions" refers to a laboratory that is maintained at 23±2° C. and 50±10% relative humidity; and specimens to be tested were conditioned for at least 24 hours in this laboratory prior to testing. ASTM refers to the American Society for Testing and Materials.

Density

Polymer (e.g. ethylene copolymer) densities were determined using ASTM D792-13 (Nov. 1, 2013).

Melt Index and Stress Exponent

Ethylene copolymer melt index was determined using ASTM D1238 (Aug. 1, 2013). Melt indexes, $I_2$, $I_6$, $I_{10}$ and $I_{21}$ were measured at 190° C., using weights of 2.16 kg, 6.48 kg, 10 kg and a 21.6 kg respectively. Herein, the term "stress exponent" or its acronym "S.Ex.", is defined by the following relationship: S.Ex.=log ($I_6/I_2$)/log(6480/2160) wherein $I_6$ and $I_2$ are the melt flow rates measured at 190° C. using 6.48 kg and 2.16 kg loads, respectively.

Neutron Acitvation (Elemental Analysis)

Neutron Activation Analysis, hereinafter N.A.A., was used to determine catalyst metal residues in ethylene copolymers as follows. A radiation vial (composed of ultrapure polyethylene, 7 mL internal volume) was filled with an ethylene copolymer composition sample and the sample weight was recorded. Using a pneumatic transfer system the sample was placed inside a SLOWPOKE™ nuclear reactor (Atomic Energy of Canada Limited, Ottawa, Ontario, Canada) and irradiated for 30 to 600 seconds for short half-life elements (e.g., Ti, V, Al, Mg and Cl) or 3 to 5 hours for long half-life elements (e.g. Zr, Hf, Cr, Fe and Ni). The average thermal neutron flux within the reactor was $5 \times 10^{11}$/$cm^2$/s. After irradiation, samples were withdrawn from the reactor and aged, allowing the radioactivity to decay; short half-life elements were aged for 300 seconds or long half-life elements were aged for several days. After aging, the gamma-ray spectrum of the sample was recorded using a germanium semiconductor gamma-ray detector (Ortec model GEM55185, Advanced Measurement Technology Inc., Oak Ridge, TN, USA) and a multichannel analyzer (Ortec model DSPEC Pro). The amount of each element in the sample was calculated from the gamma-ray spectrum and recorded in parts per million relative to the total weight of the ethylene copolymer composition sample. The N.A.A. system was calibrated with Specpure standards (1000 ppm solutions of the desired element (greater than 99% pure)). One mL of solutions (elements of interest) were pipetted onto a 15 mm×800 mm rectangular paper filter and air dried. The filter paper was then placed in a 1.4 mL polyethylene irradiation vial and analyzed by the N.A.A. system. Standards are used to determine the sensitivity of the N.A.A. procedure (in counts/µg).

Gel Permeation Chromatography (GPC)

Ethylene copolymer samples (polymer) solutions (1 to 3 mg/mL) were prepared by heating the polymer in 1,2,4-trichlorobenzene (TCB) and rotating on a wheel for 4 hours at 150° C. in an oven. An antioxidant (2,6-di-tert-butyl-4-methylphenol (BHT)) was added to the mixture in order to stabilize the polymer against oxidative degradation. The BHT concentration was 250 ppm. Polymer solutions were chromatographed at 140° C. on a PL 220 high-temperature chromatography unit equipped with four SHODEX® columns (HT803, HT804, HT805 and HT806) using TCB as the mobile phase with a flow rate of 1.0 mL/minute, with a differential refractive index (DRI) as the concentration detector. BHT was added to the mobile phase at a concentration of 250 ppm to protect GPC columns from oxidative degradation. The sample injection volume was 200 µL. The GPC columns were calibrated with narrow distribution polystyrene standards. The polystyrene molecular weights were converted to polyethylene molecular weights using the Mark-Houwink equation, as described in the ASTM standard test method D6474-12 (December 2012). The GPC raw data were processed with the CIRRUS® GPC software, to produce molar mass averages ($M_n$, $M_w$, $M_z$) and molar mass distribution (e.g. Polydispersity, $M_w/M_n$). In the polyethylene art, a commonly used term that is equivalent to GPC is SEC, i.e. Size Exclusion Chromatography.

GPC-FTIR

Ethylene copolymer (polymer) solutions (2 to 4 mg/mL) were prepared by heating the polymer in 1,2,4-trichlorobenzene (TCB) and rotating on a wheel for 4 hours at 150° C. in an oven. The antioxidant 2,6-di-tert-butyl-4-methylphenol (BHT) was added to the mixture in order to stabilize the polymer against oxidative degradation. The BHT concentration was 250 ppm. Sample solutions were chromatographed at 140° C. on a Waters GPC 150C chromatography unit equipped with four SHODEX columns (HT803, HT804, HT805 and HT806) using TCB as the mobile phase with a flow rate of 1.0 mL/minute, with a FTIR spectrometer and a heated FTIR flow through cell coupled with the chromatography unit through a heated transfer line as the detection system. BHT was added to the mobile phase at a concentration of 250 ppm to protect SEC columns from oxidative degradation. The sample injection volume was 300 µL. The raw FTIR spectra were processed with OPUS® FTIR software and the polymer concentration and methyl content were calculated in real time with the Chemometric Software (PLS technique) associated with the OPUS. Then the polymer concentration and methyl content were acquired and baseline-corrected with the CIRRUS GPC software. The SEC columns were calibrated with narrow distribution polystyrene standards. The polystyrene molecular weights were converted to polyethylene molecular weights using the Mark-Houwink equation, as described in the ASTM standard test method D6474. The comonomer content was calculated based on the polymer concentration and methyl content predicted by the PLS technique as described in Paul J. DesLauriers, Polymer 43, pages 159-170 (2002); herein incorporated by reference.

Short Chain Branching—GPC-FTIR

Short chain branches per 1000 carbon atoms, is measured relative to the copolymer fractions of different molecular weights. When plotted on a semi-logarithmic scale graph, the sloping line (from low molecular weight fractions to high molecular weight fractions on the logarithmic horizontal X-axis and the number of short chain branches on the vertical y-axis) is the short chain branching distribution determined by Fourier Transform Infra-Red (FTIR) spectrometry for the different molecular weight fractions. The GPC-FTIR method measures total methyl content, which includes the methyl groups located at the ends of each macromolecular chain, i.e. methyl end groups. Thus, the raw GPC-FTIR data must be corrected by subtracting the contribution from methyl end groups. To be more clear, the raw GPC-FTIR data overestimates the amount of short chain branching (SCB) and this overestimation increases as molecular weight (M) decreases. In this disclosure, raw GPC-FTIR data was corrected using the 2-methyl correction. At a given molecular weight (M), the number of methyl end groups ($N_E$) was calculated using the following equation; $N_E$=28000/M, and $N_E$ (M dependent) was subtracted from the raw GPC-FTIR data to produce the SCB/1000C (2-Methyl Corrected) GPC-FTIR data.

Differential Scanning Calorimetry (DSC)

DSC testing was conducted in general accordance with ASTM D3418. This analysis is performed by subjecting a polymer sample (5-10 mg prepared in an aluminum pan) and a reference material (empty aluminum pan) to a constant rate of temperature change within the DSC cell. The actual temperatures of the sample and reference are monitored by the instrument as the sample temperature is increased or decreased linearly with time. If the sample undergoes a transition, reaction, or transformation, the rate at which its temperature changes will differ from that of the reference. The instrument (TA Instruments Q2000) was first calibrated with indium; after the calibration, a polymer specimen is equilibrated at 0° C. and then the temperature was increased to 200° C. at a heating rate of 10° C./min; the melt was then kept isothermally at 200° C. for five minutes; the melt was then cooled to 0° C. at a cooling rate of 10° C./min and kept at 0° C. for five minutes; the specimen was then heated to 200° C. at a heating rate of 10° C./min. The difference in temperature between the sample and reference (DT=Treference−Tsample) is then plotted against the sample temperature to produce a differential thermogram. From this plot, the melting peak temperatures (° C.), enthalpy of fusion (J/g) and crystallinity (%) was determined.

Dynamic Mechanical Analysis (DMA)

Oscillatory shear measurements under small strain amplitudes were carried out to obtain linear viscoelastic functions at 190° C. under $N_2$ atmosphere, at a strain amplitude of 10% and over a frequency range of 0.02-126 rad/s at 5 points per decade. Frequency sweep experiments were performed with a TA Instruments DHR3 stress-controlled rheometer using cone-plate geometry with a cone angle of 5°, a truncation of 137 μm and a diameter of 25 mm. In this experiment a sinusoidal strain wave was applied and the stress response was analyzed in terms of linear viscoelastic functions. The zero shear rate viscosity ($\eta_0$) based on the DMA frequency sweep results was predicted by Ellis model (see R. B. Bird et al. "Dynamics of Polymer Liquids. Volume 1: Fluid Mechanics" Wiley-Interscience Publications (1987) p. 228) or Carreau-Yasuda model (see K. Yasuda (1979) PhD Thesis, IT Cambridge).

Capillary Rheology

Rheological data obtained from the Dynisco LCR7000 capillary rheometer was used for obtaining the viscosity profiles at different shear rates for different resins. In the capillary extrusion rheometer, the material is held in a temperature-controlled barrel and forced through an accurately dimensioned die by a piston. Bore dimensions, die dimensions and the piston speed determine the apparent rate of shear being applied to the material, and the force and die dimensions are used to calculate the apparent shear stress. The shear viscosity can be obtained from capillary flow method using the Poiseuille's Law:

$$\sigma_s = \left(\frac{PR}{2L}\right)$$

$$\frac{\partial \gamma}{\partial t} = (4Q)(\pi R^3)$$

where P=pressure drop across the capillary (N/m²); R=radius of capillary (m); L=length of the capillary (m); Q=volumetric flow rate (m³/sec); $\sigma_s$=apparent shear stress; $\partial\gamma/(\partial t)$=apparent shear rate.

The shear rate, shear stress and shear viscosity determined using the Poiseuille's equation are normally referred to as an apparent shear viscosity, shear stress and shear rate. This is due to fact that the non-Newtonian character of most fluids, and the pressure drop across the die entry and exit pressure are not taken into consideration. The test temperature was set up at 200° C. The length of the capillary used was 30.48 mm and the die diameter was 1.524 mm in this evaluation.

Melt Strength

The melt strength is measured on Rosand RH-7 capillary rheometer (barrel diameter=15 mm) with a flat die of 2-mm Diameter, L/D ratio 10:1 at 190° C. Pressure Transducer: 10,000 psi (68.95 MPa). Piston Speed: 5.33 mm/min. Haul-off Angle: 52°. Haul-off incremental speed: 50-80 m/min² or 65±15 m/min². A polymer melt is extruded through a capillary die under a constant rate and then the polymer strand is drawn at an increasing haul-off speed until it ruptures. The maximum steady value of the force in the plateau region of a force versus time curve is defined as the melt strength for the polymer.

Vicat Softening Point (Temperature)

The Vicat softening point of an ethylene copolymer sample was determined according to ASTM D1525-07 (published December 2009). This test determines the temperature at which a specified needle penetration occurs when samples are subjected to ASTM D1525-07 test conditions, i.e., heating Rate B (120±10° C./hr and 938 gram load (10±0.2N load).

CYTSAF/TREF (CTREF)

The "Composition Distribution Breadth Index", hereinafter CDBI, of the ethylene copolymers (and Comparative Examples) was measured using a CRYSTAF/TREF 200+ unit equipped with an IR detector, hereinafter the CTREF. The acronym "TREF" refers to Temperature Rising Elution Fractionation. The CTREF was supplied by Polymer Characterization, S. A. (Valencia Technology Park, Gustave Eiffel, 8, Paterna, E-46980 Valencia, Spain). The CTREF was operated in the TREF mode, which generates the chemical composition of the polymer sample as a function of elution temperature, the Co/Ho ratio (Copolymer/Homopolymer ratio) and the CDBI (the Composition Distribution Breadth Index), i.e. $CDBI_{50}$ and $CDBI_{25}$. A polymer sample (80 to 100 mg) was placed into the reactor vessel of the CTREF. The reactor vessel was filled with 35 ml of 1,2,4-trichlorobenzene (TCB) and the polymer was dissolved by heating the solution to 150° C. for 2 hours. An aliquot (1.5 mL) of the solution was then loaded into the CTREF column which was packed with stainless steel beads. The column, loaded with sample, was allowed to stabilize at 110° C. for 45 minutes. The polymer was then crystallized from solution, within the column, by dropping the temperature to 30° C. at a cooling rate of 0.09° C./minute. The column was then equilibrated for 30 minutes at 30° C. The crystallized polymer was then eluted from the column with TCB flowing through the column at 0.75 mL/minute, while the column was slowly heated from 30° C. to 120° C. at a heating rate of 0.25° C./minute. The raw CTREF data were processed using Polymer Char software, an Excel spreadsheet and CTREF software developed in-house. $CDBI_{50}$ was defined as the percent of polymer whose composition is within 50% of the median comonomer composition; $CDBI_{50}$ was calculated from the composition distribution cure and the normalized cumulative integral of the composition distribution curve, as described in U.S. Pat. No. 5,376,439. Those skilled in the art will understand that a calibration curve is required to convert a CTREF elution temperature to comonomer content, i.e. the amount of comonomer in the ethylene/α-olefin polymer fraction that elutes at a specific temperature. The generation of such calibration curves are described in the prior art, e.g. Wild, et al., J. Polym. Sci., Part B, Polym. Phys., Vol. 20 (3), pages 441-455: hereby fully incorporated by reference. $CDBI_{25}$ as calculated in a similar manner; $CDBI_{25}$ is defined as the percent of polymer whose composition is with 25% of the median comonomer composition. At the end of each sample run, the CTREF column was cleaned for 30 minutes; specifically, with the CTREF column temperature at 160° C., TCB flowed (0.5 mL/minute) through the column for 30 minutes.

Film Opticals

Film optical properties (of the base unstretched multilayer precursor films as well as the stretched multilayer films) were measured as follows: Haze, ASTM D1003-13 (Nov. 15, 2013), and Gloss 45, ASTM D2457-13 (Apr. 1, 2013).

Film Elmendorf Tear

Film tear performance (of the base unstretched multilayer precursor films as well as the stretched multilayer films) was determined by ASTM D1922-09 (May 1, 2009); an equivalent term for tear is "Elmendorf tear". Film tear was measured in both the machine direction (MD) and the transverse direction (TD) of the blown films.

Mechanical Properties

Tensile tests in both machine and transverse directions (MD and TD, respectively) were conducted in general compliance with ASTM D882. The width of the specimen used for the tensile property measurement was 1.0 inch. The initial stretching speed is 1.0 inch/min to 5% Strain and then the speed is increased to 20.0 inches/min until break. The grip separation is 2.0 inches. Mechanical properties measured are tensile break stress (reported in MPa), strain at yield (%), yield stress (MPa), strain at break (%), break stress (MPa). 1 and 2% secant modulus (MPa) are measured using 1.0 inch wide specimens, 2 inch grip separation at a test speed of 1.0 inch/min.

Water Vapor Transmission Rate, WVTR

The water vapor transmission rate ("WVTR", expressed as grams of water vapor transmitted per 100 square inches of film per day at a specified film thickness (mils), or g/100 in$^2$/day) was measured in general accordance with ASTM F1249 using an instrument sold under the name Ametek by MOCON (of Minneapolis, USA). The tests were conducted at 100° F. (37.8° C.) and 100% relative humidity.

Oxygen Transmission Rate, OTR

The oxygen transmission rate ("OTR", expressed as in cm$^2$, per 100 inch$^2$, per day at a specified film thickness (mils)) was measured in general accordance with ASTM D3985-17 using an instrument sold under the name Ametek by MOCON (of Minneapolis, USA). Tests were conducted at 23° C., 0% relative humidity, and 1 atm pressure. A mixture of 98% nitrogen (N2) and 2% hydrogen ($H_2$) was used as the carrier gas and 100% oxygen (O2) was used as the test gas. The test was ended when the oxygen flux changed by less than 1% during a 15 minute test cycle. The reported data have been normalized (multiplied) by the films' thickness and are an average of four tests.

Puncture Resistance

Film puncture resistance (of the base unstretched precursor multilayer films as well as the stretched multilayer films) was measured in terms of the Film Puncture (J/mm) according to the ASTM D5748-95. The film displacement was recorded against the force (lb) and the maximum force was reported as the Puncture Force at Break (lb) in accordance with the ASTM D5748-95.

Film Thickness

Film thickness for the base unstretched precursor multilayer films and the stretched multilayer films were measured according to ASTM D 6988-13.

Polymerization Process

An ethylene copolymer was prepared in a multi-zone solution polymerization process in which three polymerization zones, each defined by a different polymerization reactor, were configured in series with one another (See FIG. 1). The first polymerization zone was defined by a first tubular reactor (reactor 1); the second polymerization zone was defined by an optionally stirred, tank reactor (reactor 2); and a third polymerization zone was defined by a second tubular reactor (reactor 3). Each of the reactors has an inlet, where process flows enter the reactor, and an outlet, where process flows exit the reactor. For the tubular reactors the inlet is located at the upstream terminal end of the reactor, while the outlet is located at the downstream terminal end of the reactor. In the present polymerization process, the tank reactor (reactor 2), which received process flows from the first tubular reactor, although it was an optionally stirred tank reactor in which an agitator was present, it was operated without agitation, and hence functioned as a sort of plug flow reactor. In the present disclosure then, a tank reactor which is optionally equipped with an agitator is referred to as operating in "plug flow mode" when the agitator is shut off.

The first tubular reactor (reactor 1) was a 6" diameter pipe, 36.6 meters long with a total volume of 500 liters. A Ziegler-Natta polymerization catalyst was injected at the beginning of the first tubular reactor (reactor 1), at the tubular reactor inlet (location A in FIG. 1), along with solvent (cyclohexane), hydrogen, ethylene and 1-butene to initiate the polymerization reaction (note: the Ziegler-Natta polymerization catalyst components, as described further below, were brought together just upstream of the first tubular reactor inlet; not shown in FIG. 1). Hydrogen was also fed to a second location in the first tubular reactor at a location which was approximately 50 percent along the length of the tubular reactor, downstream from the inlet (location B in FIG. 1). In the present solution phase polymerization process, the polymerization reaction continued throughout the length of the first tubular reactor (reactor 1), within the tank reactor (reactor 2) and then throughout the length of second tubular reactor (reactor 3), as process flows moved from the first tubular reactor toward and into the tank reactor, and then into the second tubular reactor. Eight temperature indicators positioned along the first tubular reactor were used to monitor the polymerization reaction temperature profile.

Reactor 2 was a tank (or "autoclave") reactor with a volume of 3,640 liters and was protected by a relief valve set at 19.1 MPa. The tank reaction vessel was constructed of carbon steel with the inlet nozzles being Monel plated. Four baffles, 11.4 cm wide running vertically 6.35 cm from the walls and at 90° to each other, stopped any circulation action from occurring in the vessel as a result of the presence of an agitator. The agitator was equipped with five hubs, with six impeller blades each, equally spaced through the height of the reaction vessel. The tank reactor agitator was not used (although present, it was not turned on) during the present solution phase polymerization process, and hence the tank reactor was operated in "plug flow mode". Temperature indicators placed across the tank reactor were used to monitor the polymerization reaction temperature profile. The tank reaction vessel was also traced with high-pressure steam.

Reactor 3 was a second tubular reactor having a 10" diameter pipe and was 53 meters long. Temperature indicators placed across the tank reactor were used to monitor the polymerization reaction temperature profile.

Polymerization in the solution polymerization process was terminated by adding a catalyst deactivator to the exit stream exiting the outlet of the second tubular reactor (reactor 3). The catalyst deactivator used was pelargonic acid.

Solution absorbers (activated aluminum) are used to remove the Ziegler-Natta catalyst metal residues (vanadium and zirconium) to trace quantities.

A two-stage devolatilization process was employed to recover the ethylene copolymer from the process solvent, i.e. two vapor/liquid separators were used and the second bottom stream (from the second V/L separator) was passed through a gear pump/pelletizer combination.

DHT-4V (hydrotalcite), supplied by Kyowa Chemical Industry Co. Ltd., Tokyo, Japan may be used as a passivator, or acid scavenger, in the solution process. A slurry of DHT-4V in process solvent may be added prior to the first V/L separator.

Two single screw extruders pelletize the resin product and pellets are subsequently devitalized in a nitrogen and steam-fed stripper.

Prior to pelletization the ethylene copolymer was stabilized by adding 1000 ppm of IRGANOX® 1010 (a primary antioxidant) and 1,000 ppm of IRGAFOS® 168 (a secondary antioxidant), based on weight of the ethylene copolymer composition. Antioxidants were dissolved in process solvent and added between the first and second V/L separators.

The Ziegler-Natta polymerization catalyst which was used to carry out the polymerization reaction was fed to the inlet of the first tubular reactor and was made of three components: (i) a vanadium precatalytic compound, $VOCl_3$; (ii) a titanium precatalytic component, titanium tetrachloride, $TiCl_4$; and (iii) a cocatalytic compound, triethylaluminum, $(C_2H_5)_3Al$. The $VOCl_3$ and $TiCl_4$ compounds were first combined (in cyclohexane) in a weight ratio of 80/20, and then combined with triethylaluminum just prior to injection into the first tubular reactor at the inlet of the first tubular reactor (location A in FIG. 1).

Details of the solution phase polymerization carried out in a multi-zone reaction system according to the present disclosure are provided in Table 1. The details of ethylene copolymers made according to the present disclosure are provided in Table 2 together with a comparative ethylene copolymer. Comparative ethylene copolymer, "Comparative 3" is an ethylene/1-hexene copolymer made in a gas phase process using a chromium catalyst and is available from NOVA Chemicals Corporation as HF-Y450-A.

Further details of the ethylene copolymers made according to the present disclosure as well as a comparative example are shown in FIGS. 2 to 7.

TABLE 1

Polymerization Process Conditions

| Example No. | Inventive 1 | Inventive 2 |
|---|---|---|
| Hydrogen Injection Locations[1] | LOCATION A and LOCATION B | LOCATION A and LOCATION B |
| Cocatalyst/Catalyst ratio (Al/V + Ti)[2] | 1.4 | 1.28 |
| Reactor 1 Inlet Temperature (° C.)[3] | 116.6 | 115.5 |
| Reactor 2 Mean Temperature (° C.)[4] | 213 | 213.5 |
| Reactor 2 Delta Temperature (° C.)[5] | 64.6 | 63.5 |
| Reactor 2 Outlet Temperature (° C.)[6] | 307 | 308 |
| Reactor 3 Delta Temperature (° C.)[7] | 2.35 | 3.54 |
| Reactor 3 Outlet Temperature (° C.)[8] | 309 | 309 |
| TSR[9] | 158 | 135 |
| Total ethylene Conversion from a Heat/Mass Balance | 94.7 | 93.8 |
| Ethylene Concentration[10] | 16.74 | 17.2 |
| 1-Butene/Ethylene Input [11] | 0.060 | 0.107 |
| Hydrogen fed to "LOCATION A", at the inlet of the first tubular reactor[12] | 4.2 | 5.99 |
| Hydrogen fed to "LOCATION B", downstream of the inlet of the first tubular reactor (reactor 1) at a location which was approximately 50 percent down the length of the first tubular reactor[13] | 18.7 | 44.4 |

TABLE 1-continued

Polymerization Process Conditions

| Example No. | Inventive 1 | Inventive 2 |
|---|---|---|
| Percentage of ethylene copolymer made in the first tubular reactor (reactor 1) calculated from a heat/mass balance[14] | 33.5 | 32.4 |

Note
[1] These are the locations of the hydrogen injection points along the length of the first tubular reactor. "A" is at the inlet to the first tubular reactor; this is also known as the reactor feed pump (RFP) location. "B" is located down-stream along the first tubular reactor but still withing the length of the first tubular reactor and before the (unstirred) tank reactor. Location "B" is about 50 percent along the length of the first tubular reactor, downstream from the inlet, Location "A".

Note
[2] The molar ratio of Al in cocatalyst, triethylaluminum to the metal content (V + Ti) of precatalytic mixture of $VOCl_3$ and $TiCl4$ mixed at a ratio of 80/20 by weight.

Note
[3] The inlet temperature to the first tubular reactor (reactor 1).

Note
[4] The average temperature of the (unstirred) tank reactor (reactor 2).

Note
[5] The temperature difference, inlet to outlet, across the (unstirred) tank reactor (reactor 2).

Note
[6] The outlet temperature of the (unstirred) tank reactor (reactor 2).

Note
[7] The temperature difference between the outlet temperature of the (unstirred) tank reactor (reactor 2) which is also the inlet temperature of the second tubular reactor (reactor 3) and the outlet temperature of the second tubular reactor (reactor 3).

Note
[8] The outlet temperature of the second tubular reactor (reactor 3), and just before just before deactivation of the polymerization catalyst.

Note
[9] TSR is the total solution rate, defined as the sum of all the mass flows to the reactor inlet (of the first tubular reactor) in units of Tonnes per hour.

Note
[10] The reactor inlet (of the first tubular reactor) ethylene concentration in units of weight percent, wt %.

Note
[11] The mass ratio of 1-butene/ethylene fed to the reactor inlet (of the first tubular reactor).

Note
[12] The concentration of hydrogen fed to the reactor inlet (of the first tubular reactor), in units of ppm by mass, based on the weight of the total mass flow to the multi-zone reactor system (e.g. cyclohexane + monomers (ethylene, 1-butene) + catalyst + hydrogen).

Note
[13] The concentration of hydrogen fed to the first tubular reactor at the second injection point, in units of ppm by mass, based on the weight of the total mass flow to the multi-zone reactor system (e.g. cyclohexane + monomers (ethylene, 1-butene) + catalyst + hydrogen).

Note
[14] The ratio given is equal to the weight ratio (wt %) of ethylene copolymer made in the first tubular reactor (reactor 1) relative to the total ethylene copolymer made within the entire multi-zone reactor system.

TABLE 2

Ethylene Copolymer Properties

| Example No. | Inventive 1 | Inventive 2 | Comparative 3 |
|---|---|---|---|
| Comonomer | 1-butene | 1-butene | 1-hexene |
| Melt Index, $I_2$ (g/10 min) | 0.85 | 1.38 | 0.42 |
| Density (g/cm$^3$) | 0.9485 | 0.9497 | 0.948 |
| Stress Exponent | 1.82 | 1.88 | 1.88 |
| Melt Flow Rate, $I_{21}/I_2$ | 94.88 | 104.31 | 92 |
| Mn | 11,825 | 11,743 | 12,987 |
| Mw | 118,243 | 114,588 | 163,662 |
| Mz | 611,806 | 686,920 | 1,185,157 |
| Polydispersity (Mw/Mn) | 10.00 | 9.76 | 12.6 |
| Mz/Mw | 5.2 | 6 | 7.24 |
| Melt Strength (cN) | 4.07 | 3.01 | 6.6 |
| FTIR Branch Frequency (per 1000 carbon atoms) | 2.3 | 3.0 | 2.7-2.9 |
| Vicat (° C.) | 123.7 | 121.6 | 126 |
| CTREF (CDBI$_{50}$) | 62.6 | 61.8 | 58.3 |
| CTREF (CDBI$_{25}$) | 47.7 | 44.4 | 36.2 |
| CTREF - Elution Maximum Peak Temperature | 95.8 | 96 | 96.2 |
| DSC Melting Point | 127.1 | 126.3 | 128.8 |
| Ti (ppm) | 0.572 | 0.370 | NA |
| V (ppm) | 0.444 | 0.312 | NA |

Figure 2:
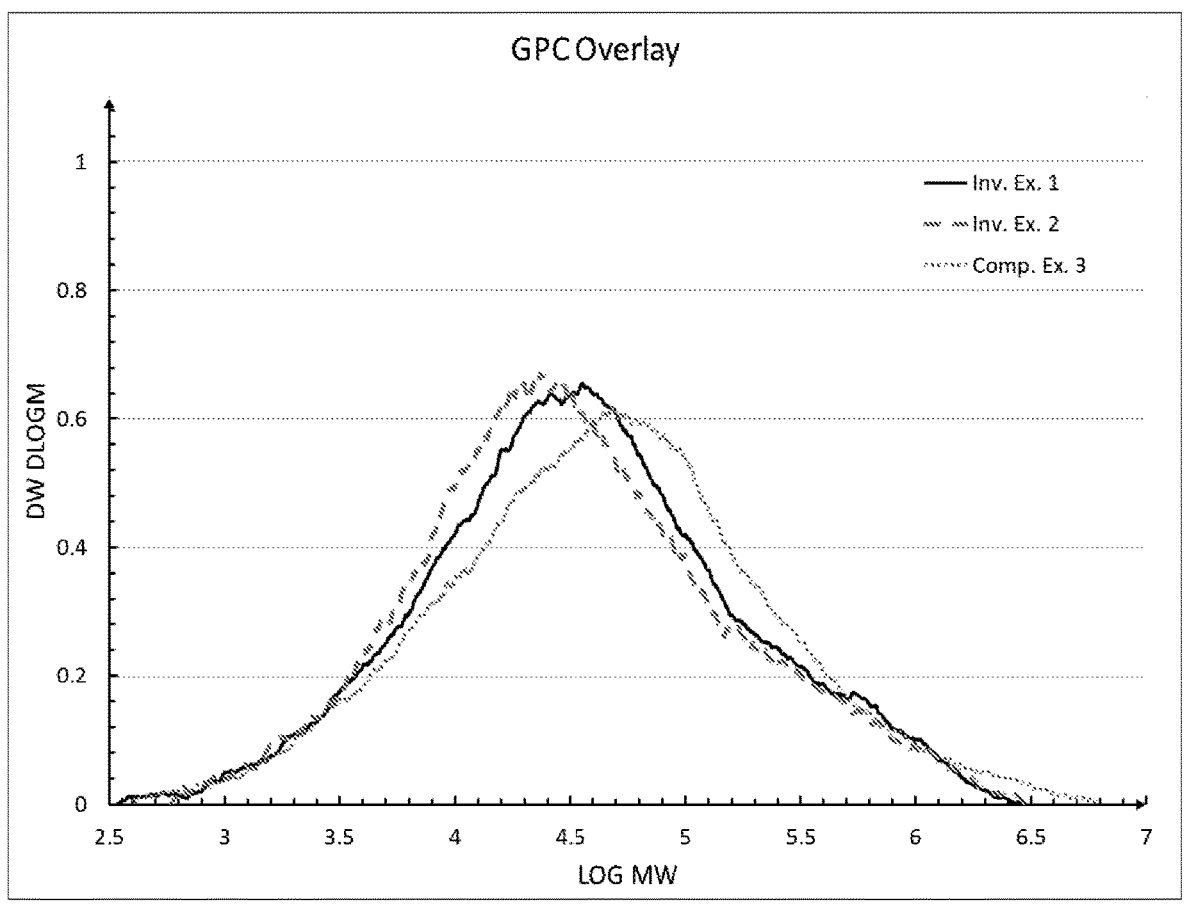
FIG. 2 shows the gel permeation chromatographs (GPC) with refractive index detection of ethylene copolymers made according to the present disclosure as well as for a comparative polyethylene.

The data in Table 2, together with FIG. 2 shows that the ethylene copolymers made according to the present disclosure (Inventive Examples 1 and 2) have a broad molecular weight distribution (i.e. a relatively high Mw/Mn) and a reasonably high molecular weight tail, features which are also found in a comparative resin made in the gas phase (Comp. Ex. 3) and which is known to be useful in the preparation of BOPE films. Although the ethylene copolymers of the present disclosure (Inv. Examples 1 and 2) have a broad molecular weight and a relatively high molecular weight tail, they nevertheless have a higher melt index, $I_2$ than the comparative resin (Comp. Example 3). Also, the comparative resin has a very high molecular weight tail (see FIG. 2 and the relatively high Mz value for Comp. Example 3 in Table 2), higher than that observed for the ethylene copolymers made according to the present disclosure. Without wishing to be bound be theory, such a very high molecular weight tail may contribute to the formation of gels when preparing BOPE films.

Figure 3:
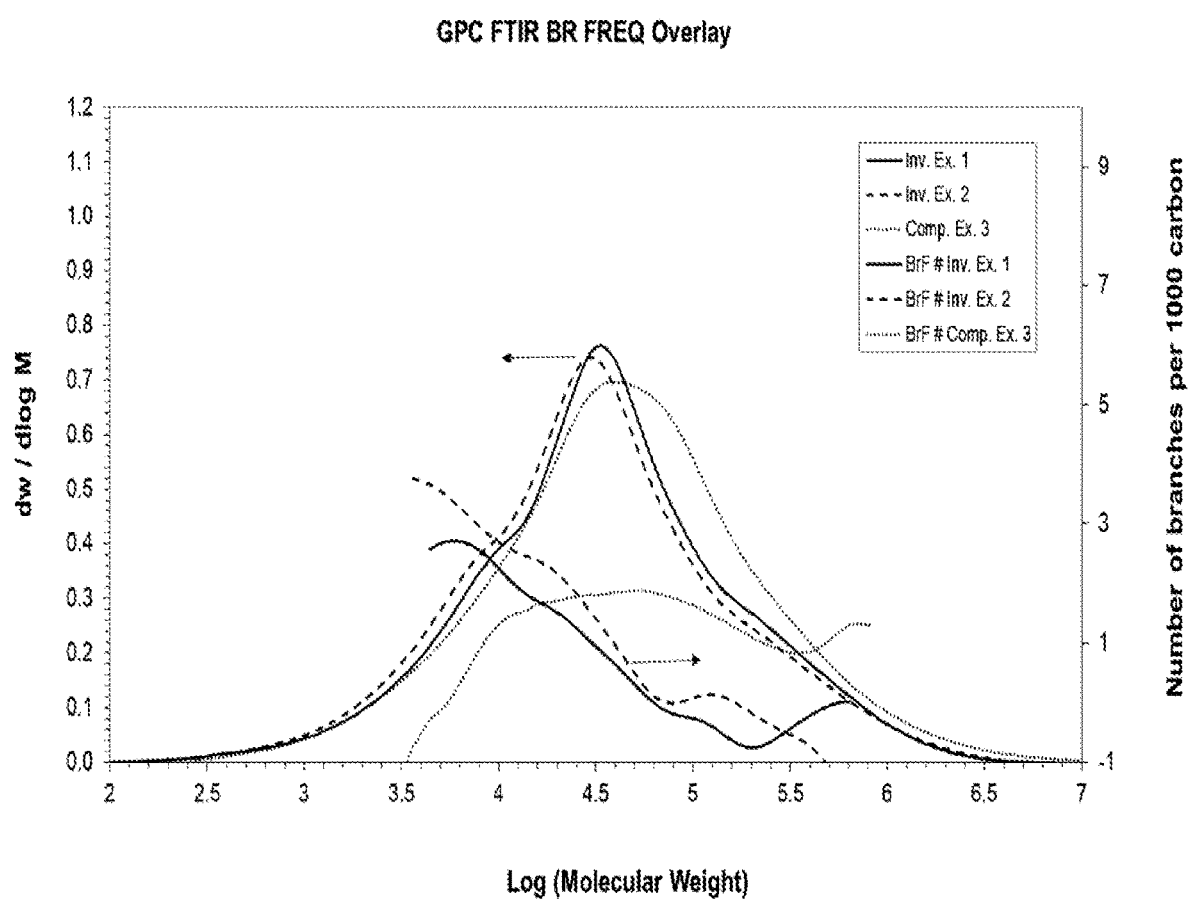
FIG. 3 shows the gel permeation chromatographs with Fourier transform infra-red (GPC-FTIR) detection obtained for ethylene copolymers made according to the present disclosure as well as for a comparative polyethylene. The comonomer content, shown as the number of short chain branches per 1000 backbone carbons (y-axis), is given relative to the copolymer molecular weight (x-axis). The downwardly sloping line (from left to right) is the short chain branching (in short chain branches per 1000 carbons atoms) determined by FTIR. As can be seen in FIG. 3, for Inventive Examples 1 and 2, the number of short chain branches generally decreases at higher molecular weights, and hence the comonomer incorporation is said to be "normal".

As shown in FIG. 3, the ethylene copolymers made according to the present disclosure (Inventive Examples 1 and 2) generally have decreasing amounts of short chain branching (branches per 1000 carbon backbone atoms) as the molecular weight of the ethylene copolymer increases.

Figure 4:
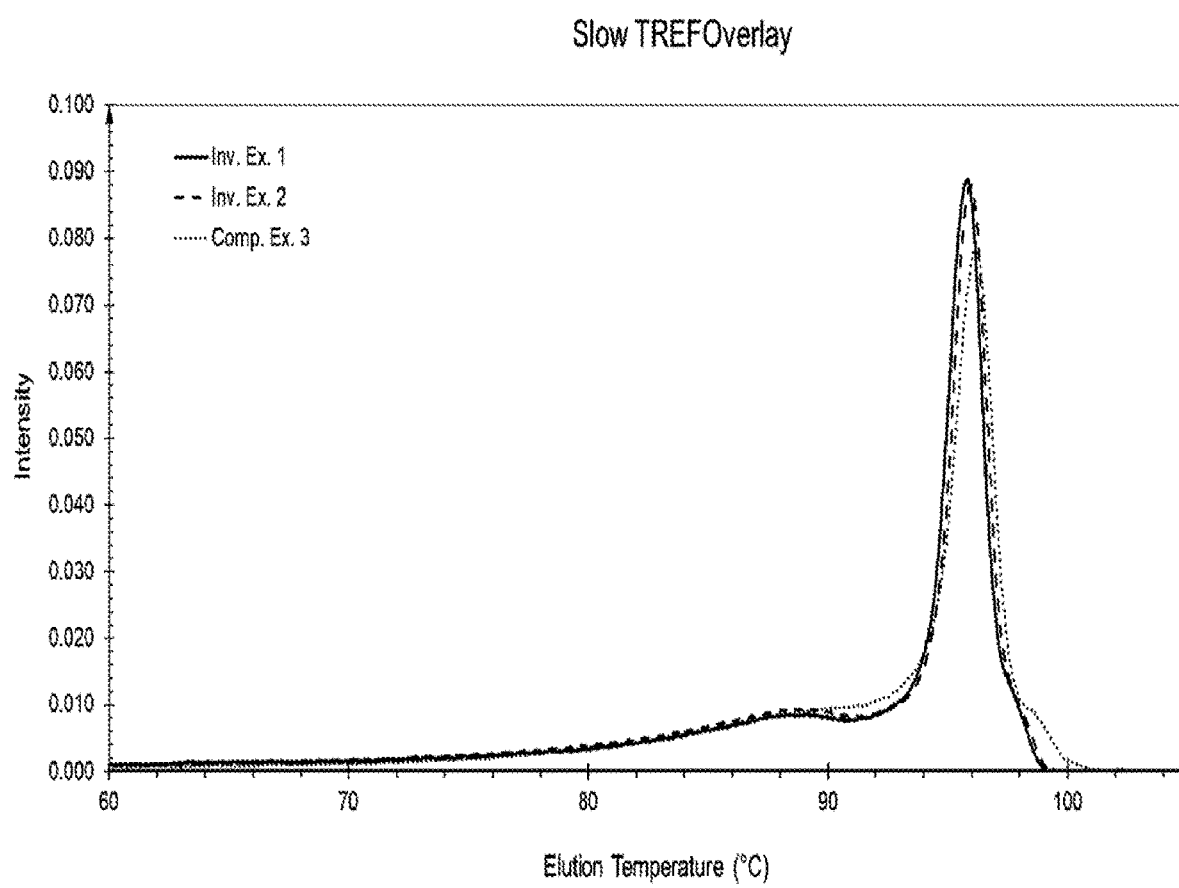
FIG. 4 shows the CTREF elution temperature profile obtained for ethylene copolymers made according to the present disclosure as well as for a comparative polyethylene.

As shown in FIG. 4, the CTREF profile of the ethylene copolymers made according to the present disclosure (Inventive Examples 1 and 2) are similar to that obtained for a comparative resin made in the gas phase (Comp. Ex. 3) and which is known to be useful in the preparation of BOPE films. The similar CTREF profiles indicate that the inventive and comparative resins have a similar amount of amorphous (non-crystalline) polymer phase present. Without wishing to be bound by theory, the presence of an adequate amount of an amorphous, non-crystalline polymer phase is believed to be helpful when stretching a base film during a BOPE process by increasing the processing window (e.g. a wider range of conditions under which the film can be successfully stretched). The presence of amorphous material may allow softening of the sheet or film and so facilitate stretching before a sharp melting of the crystalline phase occurs, thus broadening of the window of stretching. The amorphous material may also allow the sheet or the film to be elastic during the stretching process which facilitates some strain hardening, resulting in thickness uniformity during the stretching process.

Figure 5:
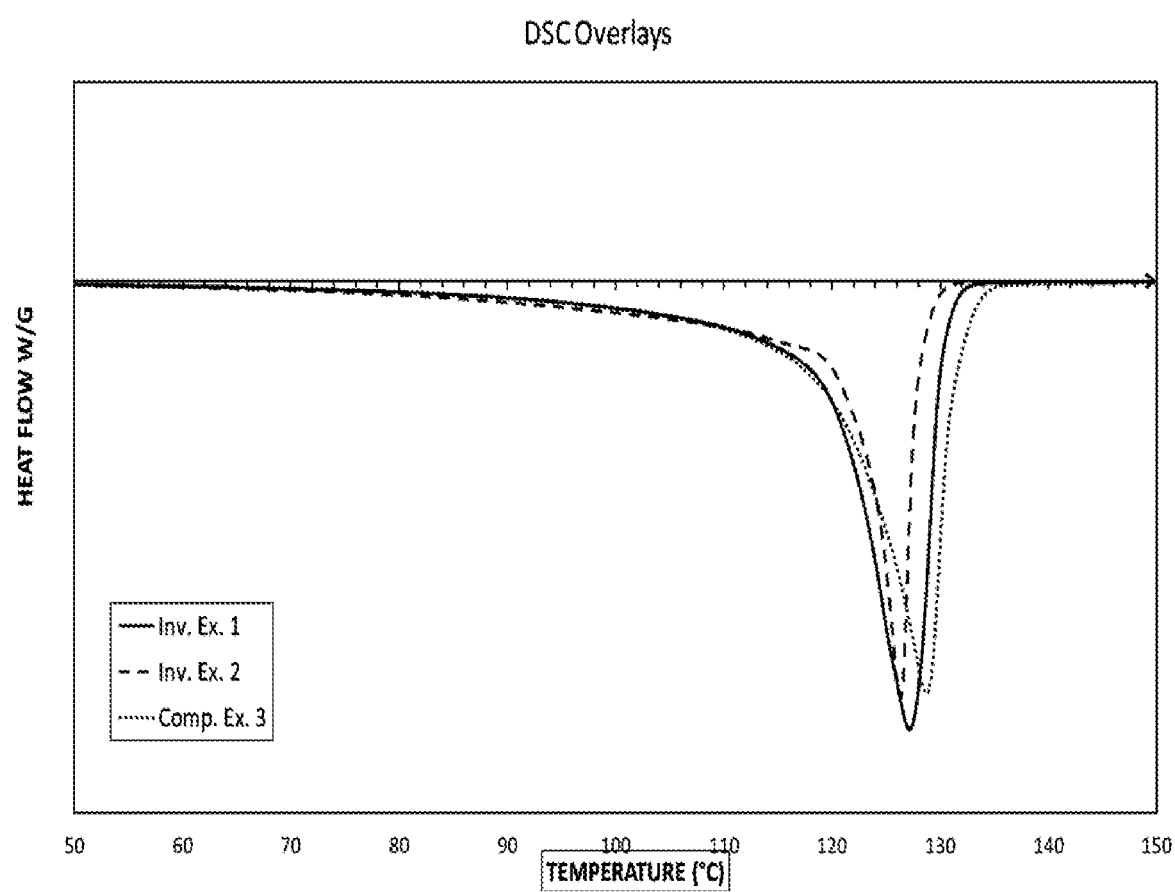
FIG. 5 shows the differential scanning calorimetry analysis (DSC) and profile of ethylene copolymers made according to the present disclosure as well as for a comparative polyethylene.

As shown in FIG. 5, the ethylene copolymers made according to the present disclosure (Inventive Examples 1 and 2) have a slightly lower melting point temperature than that obtained for comparative resin made in the gas phase (Comp. Ex. 3). Without wishing to be bound by theory a lower polymer melting point may be helpful during a biaxial stretching process to make BOPE film structures; the lower melting point indicates the presence of more amorphous material in the polymer which may help in softening the polymer sheet or film earlier during the stretching process, thus improving the stretching window.

Figure 6:
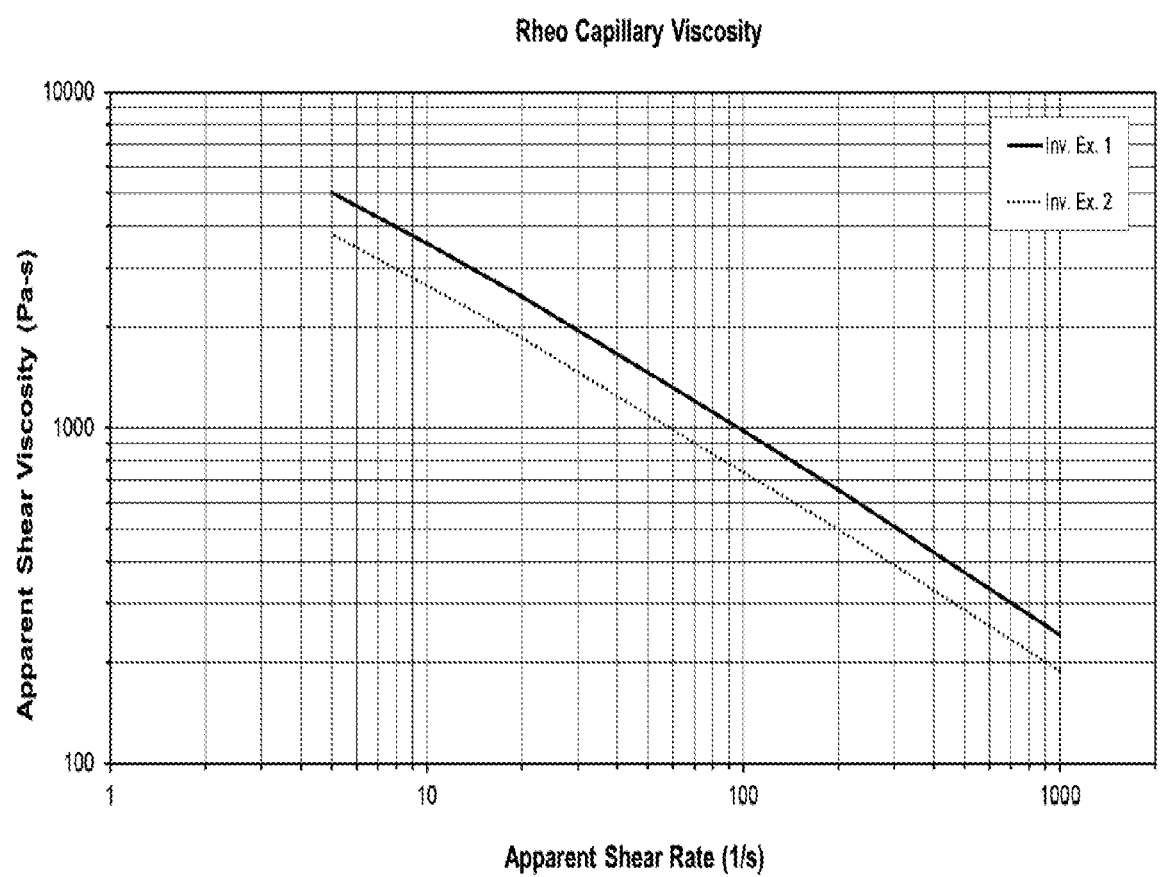
FIG. 6 shows apparent shear viscosity (in Pa·s) vs. the apparent shear rate (in $s^{-1}$) as obtained by capillary rheology for ethylene copolymers made according to the present disclosure.

FIG. 6 indicates that the ethylene copolymers made according to the present disclosure, Inventive Examples 1 and 2, have good apparent shear viscosities and have high shear thinning behavior. The good shear thinning behavior is demonstrated for both of the Inventive Examples 1 and 2, which have similar molecular weight distributions (Mw/Mn) and similar melt flow ratios ($I_{21}/I_2$) but somewhat different melt index, $I_2$ values. Without wishing to be bound by theory, the good shear thinning behavior can provide high production rates during the extrusion process to make BOPE film in a tenter frame process.

Figure 7:
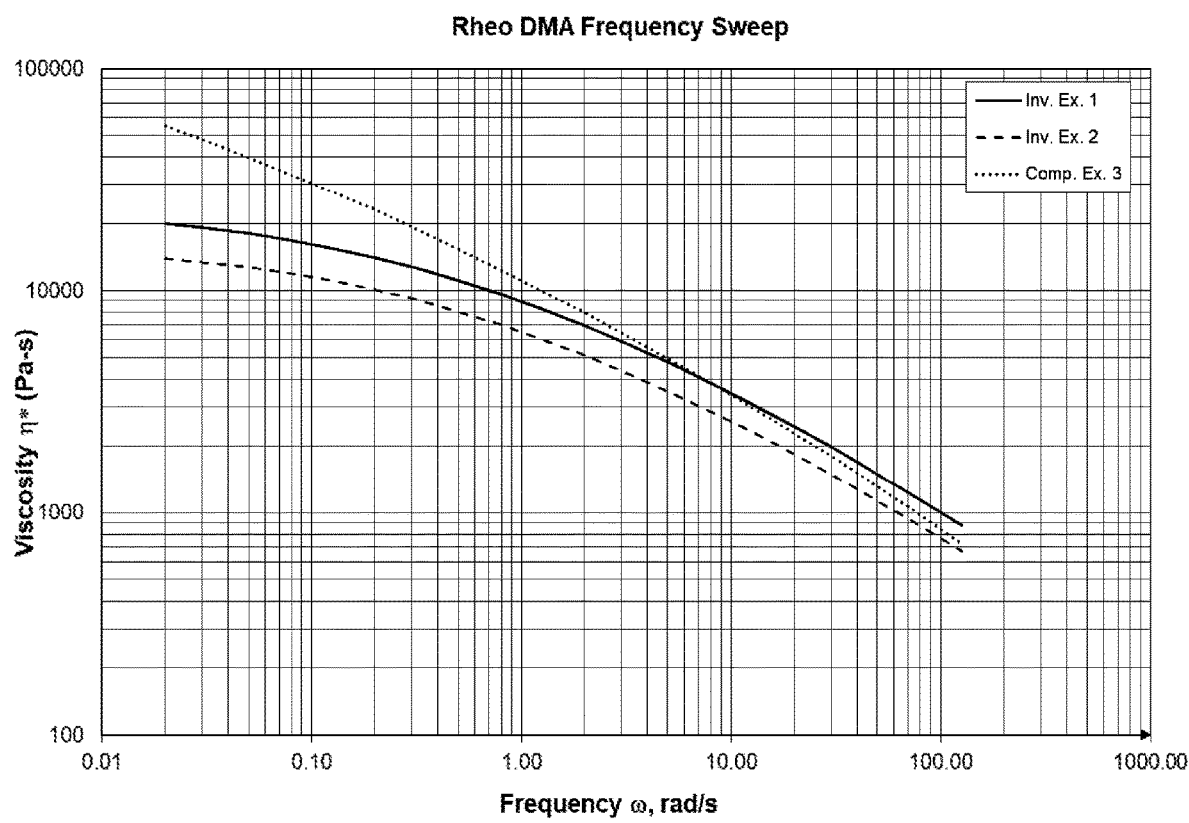
FIG. 7 shows the DMA frequency sweep data (complex viscosity, $\eta^*$ in Pa·s vs. the frequency, $\omega$ in radians/s) for ethylene copolymers made according to the present disclosure as well as for a comparative polyethylene.

FIG. 7 indicates that the ethylene copolymers made according to the present disclosure (Inventive Examples 1 and 2) have lower viscosities relative to a comparative resin made in the gas phase (Comp. Ex. 3). Without wishing to be bound by theory, lower polymer viscosities may be helpful to improve the production rate during an extrusion process to make BOPE film in a tenter frame process.

Preparation of BOPE Films

Biaxially oriented polyethylene (BOPE) films were prepared in a tenter frame process using conditions that are described below.

A. Preparation of Unstretched Film (or "Base Structure")

A multi-layer (three layer) sheet is co-extruded from three single screw extruders through a 12 inch casting die where the melt streams are combined in the feed-block located prior to the casting die. After extrusion from the die, the multi-layer sheet is pinned to the chill roll using an air knife and edge pinners and quenched on chill rolls. The primary chill roll temperature was set at 65° C. For convenience, this unstretched multilayer sheet is sometimes referred to herein as a "base structure". The weight of polymer used in each of the three layers is indicated by an A/B/C format. For example, a base structure having two exterior layers (or skin layers) that each contain 10 weight % of the total polymer and a core layer containing 80 weight % of the total polymer is described as a 10/80/10 structure.

Three layer, base film structures were prepared with Inventive Example 1 and Comparative Example 3 using the procedures described above to produce an 10/80/10 film structure, with either Inv. Example 1, or Comp. Example 3 used in each of the A, B and C layers.

A biaxially oriented polyethylene (BOPE) film was prepared from each of these base multilayer film structures using the procedures described below in Part B.

B. Biaxial Orientation Process

A sequential stretching process was used in these examples. The stretching/orientation in the machine direction was performed first. The "oriented" sheet was then stretched in the transverse direction.

The machine direction orientation (MDO) was carried out in either a single stage or a multi-stage short gap drawing process, at temperatures up to 260° F. and draw ratios up to 7.5:1. The transverse direction orientation (TDO) was carried out over multiple zones: a preheat zone, a stretching zone, an annealing zone, and finally a single cooling zone. The TDO stretch zone temperatures were up to 270° F. and the draw ratios were up to 9:1.

MDO is achieved by pre-heating the base film and stretching the sheet between two rolls that are turning at different speeds. The difference in the speeds of the rolls determines the stretch ratio. Stretching can be performed in one set of draw rolls or performed over a series of draw rolls. The stretching is generally performed at temperatures below the crystalline melting temperatures of the film (Tm). The MDO film is then fed into the tenter frame oven using clips on chains attached to rails, and pre-heated. The film is stretched as the rails diverge from one another which pull the edges of the film causing the film to stretch in the transverse direction. The width of the film is set by the distance between the rails and can be adjusted to achieve the desired stretch ratio. The TDO is performed at a similar or at slightly higher temperatures than the MDO. A summary of the process conditions is provided in Table 3.

TABLE 3

| BOPE Preparation Process Conditions | |
|---|---|
| Target Melt Temperature in Extruders | 465-475° F. |
| Die Width (inches) | 12 |
| Layer Ratio | 10/80/10 |
| Casting Roll Temperature (° F.) | 130-180 |
| Casting Roll Speed (ft/min) | 15 |
| MDO Draw Roll Temperatures (° F.) | 250-265 |
| MDO Draw Ratio | 4.75:1-6.5:1 |
| Tenter Frame Stretch Zone Temperature (° F.) | 230-260 |
| TDO Draw Ratio | 8:1-9:1 |

The properties of the BOPE multilayer films made from Inv. Example 1 or Comp. Example 3 are provided in Table 4. As shown in Table 4, a biaxially oriented polyethylene (BOPE) film was prepared from a 10/80/10 base structure of Inv. Ex. 1 at an MD stretch ratio of 6.5 and a TD stretch ratio of 9 while a biaxially oriented polyethylene (BOPE) film was prepared from a 10/80/10 base structure of Com. Ex. 3 at an MD stretch ratio of 4.75 and a TD stretch ratio of 8.

TABLE 4

| BOPE Multilayer Film Properties | | |
|---|---|---|
| Resin Used in A/B/C Film Structure | Inv. Ex. 1 | Comp. Ex. 3 |
| MD Stretch Ratio x TD Stretch Ratio | 6.5 x 9 | 4.75 x 8 |
| Film Physical Properties | | |
| Thickness Profile Ave | 0.51 | 0.81 |
| Thickness Profile (min-max) | 044-0.57 | 0.79-0.84 |

TABLE 4-continued

BOPE Multilayer Film Properties

| Resin Used in A/B/C Film Structure | Inv. Ex. 1 | Comp. Ex. 3 |
|---|---|---|
| Film Toughness | | |
| Dart Impact (g/mil) | 370 | 696 |
| Low Friction Puncture - (J/mm) | 15 | |
| Puncture (J/mm) | 42 | |
| Dynatup Film Max Load (lb) | 19.8 | 25.4 |
| Total Energy (Ftlb) | 0.32 | 0.46 |
| Energy at Max Load (Ftlb) | 0.30 | 0.43 |
| Film Tear Resistance | | |
| Tear - MD (g/mil) | 8 | 14 |
| Tear - TD (g/mil) | 11 | 6 |
| Film Stiffness | | |
| 1% Sec Modulus - MD (MPa) | 1224 | 1338 |
| 1% Sec Modulus - TD (MPa) | 1999 | 2225 |
| Film Tensile Strength | | |
| Tensile Break Str - MD (MPa) | 141 | 129 |
| Tensile Break Str - TD (MPa) | 171 | 298 |
| Elongation at Break - MD (%) | 48 | 129 |
| Elongation at Break - TD (%) | 12 | 28 |
| Tensile Yield Str - MD (MPa) | 118 | 129 |
| Tensile Yield Str - TD (MPa) | 172 | 298 |
| Tensile Energy (J) MD | 1.1 | 3.12 |
| Tensile Energy (J) TD | 0.3 | 1.36 |
| Film Opticals | | |
| 45° Gloss | 27 | 59 |
| Haze (%) | 39 | 8.2 |
| Moisture Vapour Transmission Rate (g/100 in$^2$/24 hr) | 0.446 | 0.3655 |
| Oxygen Transmission Rate (cc/100 in$^2$/24 hr) | — | 138.74 |

As the data in Table 4 shows, the Inv. Example 1 which has a similar density, but a higher melt index, $I_2$ relative to Comp. Ex 3, was successfully stretched to make BOPE in a tenter frame process. Hence, a person skilled in the art will recognize that the ethylene copolymers made according to the process of the present disclosure provide an additional and alternative ethylene copolymer, having a density in the range of 0.940 to 0.960 g/cm$^3$, which is suitable for use in a tenter frame process to make BOPE.

Non-limiting embodiments of the present disclosure include the following:

Embodiment A. An ethylene copolymer comprising ethylene and at least one alpha olefin having from 4 to 8 carbon atoms; the ethylene copolymer having a density of 0.940 to 0.960 grams per cubic centimeter (g/cm$^3$); a melt index, $I_2$ as measured by ASTM D1238 at 190° C. using a 2.16 kilogram load, of from 0.5 to 2.5 grams per 10 minutes (g/10 min); a stress exponent of from 1.75 to 1.95; a number average molecular weight, Mn, of from 11,000 to 15,000; a polydispersity index, (Mw/Mn), of from 9 to 12; and a Z-average molecular weight, Mz, of from 500,000 to 800,000.

Embodiment B. The ethylene copolymer of Embodiment A, having a composition distribution breadth index, CDBI$_{25}$, of from 40 to 50.

Embodiment C. The ethylene copolymer of Embodiment A or B, having a number average molecular weight, Mn, of from 11,000 to 12,500.

Embodiment D. The ethylene copolymer of Embodiment A or B, having a number average molecular weight, Mn, of from greater than 11,000 to less than 12,500.

Embodiment E. The ethylene copolymer of Embodiment A, B, C, or D having a Z-average molecular weight, Mz, of from 600,000 to 700,000.

Embodiment F. The ethylene copolymer of Embodiment A, B, C, D or E further characterized by containing both titanium and vanadium catalyst residues in an amount of from 0.100 to 1.5 ppm of titanium and from 0.100 to 1.5 ppm of vanadium (based on the weight of the ethylene copolymer).

Embodiment G. The ethylene copolymer of Embodiment A, B, C, D, E or F having a unimodal molecular weight distribution.

Embodiment H. The ethylene copolymer of Embodiment A, B, C, D, E, F or G having a density of from 0.940 to 0.956 g/cm$^3$.

Embodiment I. The ethylene copolymer of Embodiment A, B, C, D, E, F, G or H having a stress exponent of from 1.80 to 1.90.

Embodiment J. The ethylene copolymer of Embodiment A, B, C, D, E, F, G, H or I comprising polymerized ethylene and 1-butene.

Embodiment K. A solution phase polymerization process to make an ethylene copolymer in a multi-zone reactor system,
the multi-zone-reactor system comprising a first, second and third polymerization zone, wherein the first polymerization zone is defined by a first tubular reactor having an inlet and an outlet,
the polymerization process comprising:
feeding solvent, hydrogen, a Ziegler-Natta polymerization catalyst, ethylene, and at least one alpha olefin having 4 to 8 carbon atoms, to the inlet of the first tubular reactor to initiate a polymerization reaction;
feeding hydrogen to at least one location in the first tubular reactor which is downstream from the inlet of the first tubular reactor;
wherein at least 80 weight percent of the total amount of hydrogen added to the multi-zone reactor system, is added to the at least one location in the first tubular reactor which is downstream from the inlet of the first tubular reactor; and
wherein from 20 to 50 weight percent of the total amount of ethylene copolymer made in the multi-zone reactor system is made in the first tubular reactor.

Embodiment L. The process of Embodiment K, wherein the second polymerization zone is defined by a tank reactor having an inlet and an outlet.

Embodiment M. The process of Embodiment K or L, wherein the third polymerization zone is defined by a second tubular reactor having an inlet and an outlet.

Embodiment N. The process of Embodiment K, L or M, wherein the at least one location in the first tubular reactor which is downstream from the inlet of the first tubular reactor is at least one location in the first tubular reactor which is from 35 percent to 65 percent downstream from the inlet along the length of the first tubular reactor.

Embodiment O. The process of Embodiment K, L or M, wherein the at least one location in the first tubular reactor which is downstream from the inlet of the first tubular reactor is at least one location in the first tubular reactor which is from 45 percent to 55 percent downstream from the inlet along the length of the first tubular reactor.

Embodiment P. The process of Embodiment K, L, M, N or O, wherein the tank reactor is operated as a plug flow reactor.

Embodiment Q. The process of Embodiment K, L, M, N, O or P, wherein the multi-zone reactor system is operated adiabatically.

Embodiment R. The process of Embodiment K, L, M, N, O, P or Q, wherein the inlet of the first tubular reactor is at a temperature of from 30 to 150° C.

Embodiment S. The process of Embodiment K, L, M, N, O, P, Q or R, wherein the inlet of the first tubular reactor is at a temperature of less than 150° C.

Embodiment T. The process of Embodiment K, L, M, N, O, P, Q, R or S, wherein at least 90 weight percent of the ethylene that is fed to the multi-zone reactor system is converted to ethylene copolymer.

Embodiment U. The process of Embodiment K, L, M, N, O, P, Q, R, S or T, wherein the Ziegler-Natta polymerization catalyst comprises titanium, vanadium and aluminum.

Embodiment V. A solution phase polymerization process to make an ethylene copolymer in a multi-zone reactor system, the multi-zone reactor system comprising a first, second and third polymerization zone, wherein the first polymerization zone is defined by a first tubular reactor having an inlet and an outlet, the polymerization process comprising:
feeding solvent, hydrogen, a Ziegler-Natta polymerization catalyst, ethylene, and at least one alpha olefin having 4 to 8 carbon atoms, to an inlet of the first tubular reactor to initiate a polymerization reaction;
feeding hydrogen to at least one location in the first tubular reactor which is downstream from the inlet of the first tubular reactor;
wherein at least 80 weight percent of the total amount of hydrogen added to the multi-zone reactor system, is added to the at least one location in the first tubular reactor which is downstream from the inlet of the first tubular reactor;
the ethylene copolymer having a density of 0.940 to 0.960 grams per cubic centimeter (g/cm$^3$); a melt index, $I_2$ as measured by ASTM D1238 at 190° C. using a 2.16 kilogram load, of from 0.5 to 2.5 grams per 10 minutes (g/10 min); a stress exponent of from 1.75 to 1.95; a number average molecular weight, Mn, of from 11,000 to 15,000; a polydispersity index, (Mw/Mn), of from 9 to 12; and a Z-average molecular weight, Mz, of from 500,000 to 800,000.

Embodiment W. A biaxially oriented polyethylene film comprising an ethylene copolymer, the ethylene copolymer comprising ethylene and at least one alpha olefin having from 4 to 8 carbon atoms; the ethylene copolymer having a density of 0.940 to 0.960 grams per cubic centimeter (g/cm$^3$); a melt index, $I_2$ as measured by ASTM D1238 at 190° C. using a 2.16 kilogram load, of from 0.5 to 2.5 grams per 10 minutes (g/10 min); a stress exponent of from 1.75 to 1.95; a number average molecular weight, Mn, of from 11,000 to 15,000; a polydispersity index, (Mw/Mn), of from 9 to 12; and a Z-average molecular weight, Mz, of from 500,000 to 800,000.

INDUSTRIAL APPLICABILITY

Ethylene copolymers are made in a multi-zone reactor system under solution phase polymerization conditions and are useful in the formation of biaxially oriented films.

The invention claimed is:

1. An ethylene copolymer comprising ethylene and at least one alpha olefin having from 4 to 8 carbon atoms; wherein the ethylene copolymer has a density of 0.940 to 0.960 grams per cubic centimeter (g/cm$^3$); a melt index, $I_2$ as measured by ASTM D1238 at 190° C. using a 2.16 kilogram load, of from 0.5 to 2.5 grams per 10 minutes (g/10 min); a stress exponent of from 1.75 to 1.95; a number average molecular weight, Mn, of from 11,000 to 15,000; a polydispersity index, (Mw/Mn), of from 9 to 12; and a Z-average molecular weight, Mz, of from 500,000 to 800,000.

2. The ethylene copolymer of claim 1, wherein the ethylene copolymer has a composition distribution breadth index, $CDBI_{25}$, of from 40 to 50.

3. The ethylene copolymer of claim 1, wherein the ethylene copolymer has a number average molecular weight, Mn, of from 11,000 to 12,500.

4. The ethylene copolymer of claim 1, wherein the ethylene copolymer has a number average molecular weight, Mn, of from 11,000 to 12,500.

5. The ethylene copolymer of claim 1, wherein the ethylene copolymer has a Z-average molecular weight, Mz, of from 600,000 to 700,000.

6. The ethylene copolymer of claim 1, further characterized by containing both titanium and vanadium catalyst residues in an amount of from 0.100 to 1.5 ppm of titanium and from 0.100 to 1.5 ppm of vanadium (based on a weight of the ethylene copolymer).

7. The ethylene copolymer of claim 1 wherein the ethylene copolymer has a unimodal molecular weight distribution.

8. The ethylene copolymer of claim 1, wherein the ethylene copolymer has a density of from 0.940 to 0.956 g/cm$^3$.

9. The ethylene copolymer of claim 1, wherein the ethylene copolymer has a stress exponent of from 1.80 to 1.90.

10. The ethylene copolymer of claim 1 wherein the ethylene copolymer comprises polymerized ethylene and 1-butene.

11. A solution phase polymerization process to make an ethylene copolymer in a multi-zone reactor system, the multi-zone-reactor system comprising a first, second and third polymerization zone, wherein the first polymerization zone is defined by a first tubular reactor having an inlet and an outlet, the polymerization process comprising:
feeding solvent, hydrogen, a Ziegler-Natta polymerization catalyst, ethylene, and at least one alpha olefin having 4 to 8 carbon atoms, to the inlet of the first tubular reactor to initiate a polymerization reaction;
feeding hydrogen to at least one location in the first tubular reactor which is downstream from the inlet of the first tubular reactor;
wherein at least 80 weight percent of a total amount of hydrogen added to the multi-zone reactor system, is added to the at least one location in the first tubular reactor which is downstream from the inlet of the first tubular reactor; and
wherein from 20 to 50 weight percent of a total amount of ethylene copolymer made in the multi-zone reactor system is made in the first tubular reactor.

12. The process of claim 11, wherein the second polymerization zone is defined by a tank reactor having an inlet and an outlet.

13. The process of claim 12, wherein the third polymerization zone is defined by a second tubular reactor having an inlet and an outlet.

14. The process of claim 13, wherein the at least one location in the first tubular reactor which is downstream from the inlet of the first tubular reactor is at least one location in the first tubular reactor which is from 35 percent to 65 percent downstream from the inlet along a length of the first tubular reactor.

15. The process of claim 13, wherein the at least one location in the first tubular reactor which is downstream from the inlet of the first tubular reactor is at least one location in the first tubular reactor which is from 45 percent to 55 percent downstream from the inlet along a length of the first tubular reactor.

16. The process of claim 13, wherein the tank reactor is operated as a plug flow reactor.

17. The process of claim 13, wherein the multi-zone reactor system is operated adiabatically.

18. The process of claim 13, wherein the inlet of the first tubular reactor is at a temperature of from 30 to 150° C.

19. The process of claim 13, wherein the inlet of the first tubular reactor is at a temperature of less than 150° C.

20. The process of claim 13, wherein at least 90 weight percent of the ethylene that is fed to the multi-zone reactor system is converted to ethylene copolymer.

21. The process of claim 13, wherein the Ziegler-Natta polymerization catalyst comprises titanium, vanadium, and aluminum.

22. A solution phase polymerization process to make an ethylene copolymer in a multi-zone reactor system,
the multi-zone reactor system comprising a first, second and third polymerization zone, wherein the first polymerization zone is defined by a first tubular reactor having an inlet and an outlet,
the polymerization process comprising:
feeding solvent, hydrogen, a Ziegler-Natta polymerization catalyst, ethylene, and at least one alpha olefin having 4 to 8 carbon atoms, to an inlet of the first tubular reactor to initiate a polymerization reaction;
feeding hydrogen to at least one location in the first tubular reactor which is downstream from the inlet of the first tubular reactor;
wherein at least 80 weight percent of a total amount of hydrogen added to the multi-zone reactor system, is added to at least one location in the first tubular reactor which is downstream from the inlet of the first tubular reactor; and wherein
the ethylene copolymer has a density of 0.940 to 0.960 grams per cubic centimeter (g/cm$^3$); a melt index, $I_2$ as measured by ASTM D1238 at 190° C. using a 2.16 kilogram load, of from 0.5 to 2.5 grams per 10 minutes (g/10 min); a stress exponent of from 1.75 to 1.95; a number average molecular weight, Mn, of from 11,000 to 15,000; a polydispersity index, (Mw/Mn), of from 9 to 12; and a Z-average molecular weight, Mz, of from 500,000 to 800,000.

23. A biaxially oriented polyethylene film comprising an ethylene copolymer, the ethylene copolymer comprising ethylene and at least one alpha olefin having from 4 to 8 carbon atoms; wherein the ethylene copolymer has a density of 0.940 to 0.960 grams per cubic centimeter (g/cm$^3$); a melt index, $I_2$ as measured by ASTM D1238 at 190° C. using a 2.16 kilogram load, of from 0.5 to 2.5 grams per 10 minutes (g/10 min); a stress exponent of from 1.75 to 1.95; a number average molecular weight, Mn, of from 11,000 to 15,000; a polydispersity index, (Mw/Mn), of from 9 to 12; and a Z-average molecular weight, Mz, of from 500,000 to 800,000.

* * * * *